US012394366B2

(12) United States Patent
Heo et al.

(10) Patent No.: US 12,394,366 B2
(45) Date of Patent: Aug. 19, 2025

(54) PIXEL AND DISPLAY DEVICE INCLUDING THE SAME

(71) Applicant: Samsung Display Co., Ltd., Yongin-Si (KR)

(72) Inventors: Sang Hyun Heo, Yongin-si (KR); Joon Chul Goh, Yongin-si (KR); Oh Jo Kwon, Yongin-si (KR); Dong Soo Kim, Yongin-si (KR); Hyung Gun Ma, Yongin-si (KR); Jung Hun Yi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/590,940

(22) Filed: Feb. 29, 2024

(65) Prior Publication Data

US 2024/0395192 A1 Nov. 28, 2024

(30) Foreign Application Priority Data

May 25, 2023 (KR) ........................ 10-2023-0067781

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2310/0275* (2013.01)

(58) Field of Classification Search
CPC ...... G09G 3/32; G09G 3/3208; G09G 3/3225; G09G 3/3233; G09G 3/3291; G09G 2300/0426; G09G 2330/028; H01L 29/78615; H10K 59/1213
See application file for complete search history.

(56) References Cited

U.S. PATENT DOCUMENTS

| | | | | |
|---|---|---|---|---|
| 8,436,793 | B2 | 5/2013 | Yamamoto | |
| 9,972,244 | B2 | 5/2018 | Yamashita et al. | |
| 10,622,429 | B2 | 4/2020 | Yu | |
| 10,891,899 | B2 * | 1/2021 | Jun | G09G 3/3258 |
| 2008/0074363 | A1 * | 3/2008 | Yamashita | G09G 3/3233 345/80 |
| 2020/0273397 | A1 * | 8/2020 | Jeong | H01L 33/62 |
| 2022/0028333 | A1 * | 1/2022 | Jeong | G09G 3/3275 |
| 2023/0024280 | A1 | 1/2023 | Yanase et al. | |
| 2023/0154403 | A1 | 5/2023 | Kang et al. | |
| 2023/0206834 | A1 | 6/2023 | Liu et al. | |
| 2024/0237430 | A1 * | 7/2024 | Jinta | H10K 59/65 |
| 2024/0304149 | A1 * | 9/2024 | Tian | G09G 3/3291 |

FOREIGN PATENT DOCUMENTS

| | | | |
|---|---|---|---|
| CN | 114155813 | A | 3/2022 |
| KR | 10-2245043 | B1 | 4/2021 |
| KR | 10-2332646 | B1 | 11/2021 |
| KR | 10-2344964 | B1 | 12/2021 |

* cited by examiner

*Primary Examiner* — Priyank J Shah
(74) *Attorney, Agent, or Firm* — Innovation Counsel LLP

(57) ABSTRACT

According to embodiments of the disclosure, a pixel includes a driving transistor including a gate electrode, a first electrode electrically connected to a first power line and a second electrode electrically connected to a light emitting element, a body of a semiconductive layer constituting the driving transistor being electrically connected to the first power line.

19 Claims, 17 Drawing Sheets

Vdata: Vdata(i-1), Vdata(i)

PIXEL AND DISPLAY DEVICE INCLUDING THE SAME

This application claims priority to Korean Patent Application No. 10-2023-0067781, filed on May 25, 2023, and all the benefits accruing therefrom under 35 U.S.C. § 119, the content of which in its entirety is herein incorporated by reference.

BACKGROUND

1. Field

The disclosure relates to a pixel and a display device including the same.

2. Description of the Related Art

As information technology is developed, importance of a display device, which is a connection medium between a user and information, has been highlighted. In response to this, a use of a display device such as a liquid crystal display device and an organic light emitting display device is increasing.

Recently, a head mounted display device (HMD) is being developed. The HMD is a display device that is worn by a user in a form of glasses or a helmet and implements virtual reality (VR) or augmented reality (AR) in which a focus is formed at a distance close to eyes. A high-resolution panel is applied to the HMD, and thus a pixel applicable to the high-resolution panel is required.

SUMMARY

An object of the disclosure is to provide a pixel applicable to a high-resolution panel and a display device including the same.

According to embodiments of the disclosure, a pixel includes a first capacitor connected between a first power line and a first node, a first transistor including a first electrode electrically connected to a second electrode of the first capacitor and the first power line, and a gate electrode electrically connected to a first emission control line, a driving transistor including a first electrode electrically connected to a second electrode of the first transistor, a second electrode connected to a second node, and a gate electrode connected to the first node, a second transistor including a first electrode electrically connected to a data line, and a gate electrode electrically connected to a first scan line, a third transistor connected between the first node and the second node and including a gate electrode electrically connected to a second scan line, a second capacitor connected between a second electrode of the second transistor and the first node, a light emitting element including a second electrode electrically connected to a second power line, a fourth transistor connected between the second node and a first electrode of the light emitting element, and including a gate electrode electrically connected to a second emission control line, and a fifth transistor including a first electrode electrically connected to the first electrode of the light emitting element, a second electrode electrically connected to a third power line, and a gate electrode electrically connected to a third scan line.

According to an embodiment, the driving transistor is a MOSFET including a body electrode.

According to an embodiment, a voltage of first driving power is supplied to the first power line and the voltage of the first driving power is supplied to the body electrode.

According to an embodiment, the first transistor is set to a turn-on state when a data signal is supplied to the data line.

According to an embodiment, each of the first transistor, the second transistor, the third transistor, the fourth transistor, and the fifth transistor is a MOSFET including a body electrode.

According to an embodiment, a voltage of first driving power is supplied to the first power line and the voltage of the first driving power is supplied to the body electrode.

According to an embodiment, first driving power is supplied to the first power line, second driving power having a voltage lower than that of the first driving power is supplied to the second power line, and initialization power having a voltage value at which the light emitting element does not emit light is supplied to the third power line.

According to an embodiment, a voltage value obtained by subtracting the second driving power from a voltage obtained by adding a voltage of the initialization power to an absolute threshold voltage of the fifth transistor is set to a voltage lower than a threshold voltage of the light emitting element.

According to an embodiment, the initialization power is ground (GND).

According to an embodiment, one horizontal period includes a first period, a second period, and a third period, a voltage of reference power is supplied to the data line during the first period and the second period, and a voltage of the data signal is supplied to the data line during the third period, and the second transistor, the third transistor, the fourth transistor, and the fifth transistor are set to a turn-on state, and the first transistor is set to a turn-off state, during the first period.

According to an embodiment, the first transistor, the second transistor, the third transistor, and the fifth transistor are set to a turn-on state, and the fourth transistor is set to a turn-off state during the second period.

According to an embodiment, the first transistor, the second transistor, and the fifth transistor are set to a turn-on state, and the third transistor and the fourth transistor are set to a turn-off state, during the third period.

According to an embodiment, the first transistor, the fourth transistor, and the fifth transistor are set to a turn-on state, and the second transistor and the third transistor are set to a turn-off state during a fourth period following the third period, and the first transistor and the fourth transistor are set to a turn-on state, and the second transistor, the third transistor, and the fifth transistor are set to a turn-off state during a fifth period following the fourth period.

According to an embodiment, the fourth transistor and the fifth transistor are set to a turn-on state, and the first transistor, the second transistor, and the third transistor are set to a turn-off state, during a 0-th period preceding the first period.

According to embodiments of the disclosure, a display device includes pixels connected to first scan lines, second scan lines, third scan lines, data lines, first emission control lines, and second emission control lines, and a first pixel positioned in an i-th (i is an integer greater than or equal to 0) pixel row and a j-th (j is an integer greater than or equal to 0) pixel column includes a first capacitor connected between a first power line and a first node, a first transistor including a first electrode electrically connected to a second electrode of the first capacitor and a first power line, and turned off when a first emission control signal is supplied to a k-th (k is an integer greater than or equal to 0) first emission control line, a driving transistor including a first electrode electrically connected to a second electrode of the first transistor, a second electrode connected to a second node, and a gate electrode connected to the first node, a second transistor including a first electrode electrically connected to a j-th data line and turned on when a first scan signal is supplied to an i-th first scan line, a third transistor connected between the first node and the second node and turned on when a second scan signal is supplied to an i-th second scan line, a second capacitor connected between a second electrode of the second transistor and the first node, a light emitting element including a second electrode electrically connected to a second power line, a fourth transistor connected between the second node and a first electrode of the light emitting element, and including a gate electrode electrically connected to a second emission control line, and a fifth transistor including a first electrode electrically connected to the first electrode of the light emitting element, a second electrode electrically connected to a third power line, and a gate electrode electrically connected to a third scan line.

According to an embodiment, a driving transistor included in a second pixel positioned adjacent to the first pixel is electrically connected to the first transistor included in the first pixel.

According to an embodiment, the first transistor is set to a turn-on state when a data signal is supplied to the j-th data line.

According to an embodiment, each of the driving transistor, the first transistor, the second transistor, the third transistor, the fourth transistor, and the fifth transistor is a MOSFET including a body electrode, and the body electrode is electrically connected to the first power line.

According to an embodiment, the display device further includes a data driver configured to supply data signals to the data lines, a first scan driver configured to supply first scan signals to the first scan lines, a second scan driver configured to supply second scan signals to the second scan lines, a third scan driver configured to supply third scan signals to the third scan lines, a first emission driver configured to supply first emission control signals to the first emission control lines, and a second emission driver configured to supply second emission control signals to the second emission control lines.

According to an embodiment, a specific horizontal period in which the first pixel is driven may include a first period, a second period, and a third period, the data driver supplies voltage of reference power to the j-th data line during the first period and the second period, and supplies the data signal during the third period, the first scan driver supplies the first scan signal to the i-th first scan line during the first period, the second period, and the third period, the second scan driver supplies the second scan signal to the i-th second scan line during the first period and the second period, the third scan driver supplies the third scan signal to the i-th third scan line during a 0-th period preceding the first period, the first period, the second period, the third period, and a fourth period following the third period, the first emission driver supplies the first emission control signal to the k-th first emission control line during the 0-th period and the first period, and the second emission driver supplies the second emission control signal to the k-th second emission control line during the second period and the third period.

Objects of the disclosure are not limited to the objects described above, and other technical objects which are not described will be clearly understood by those skilled in the art from the following description.

According to the pixel and the display device including the same according to embodiments of the disclosure, the pixel may be implemented using a transistor (for example, MOSFET) suitable for high resolution.

In addition, the pixel according to embodiments of the disclosure may include the driving transistor having the body electrode, and may stably compensate for a threshold voltage of the driving transistor.

In addition, the pixel according to embodiments of the disclosure may transfer the data signal using coupling of a capacitor, and thus may widely set a voltage range of the data signal.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
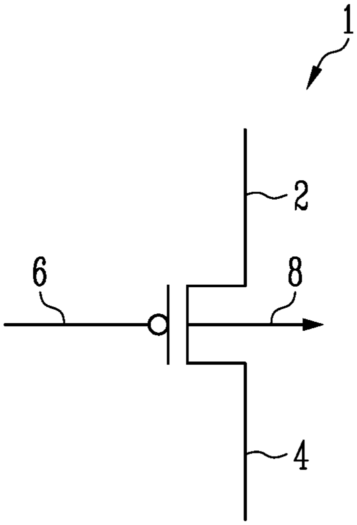
FIG. 1 is a diagram illustrating a transistor according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interactive individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms and may be implemented. In addition, each of the embodiments disclosed below may be implemented alone or in combination with at least one of other embodiments.

FIG. 1 is a diagram illustrating a transistor according to an embodiment of the disclosure.

Referring to FIG. 1, the transistor 1 according to an embodiment of the disclosure may include a first electrode 2, a second electrode 4, a gate electrode 6, and a body electrode 8. For example, the transistor 1 may be a metal-oxide-semiconductor field-effect transistor (MOSFET). The transistor 1 (for example, MOSFET) including the body electrode 8 has a small mounting area and is suitable for implementing a high-resolution pixel.

The transistor 1 may be formed on a silicon wafer. For example, a panel may be implemented by forming a transistor layer, a light emitting layer, a cover layer, and the like on the silicon wafer. However, this is exemplary, and the transistor 1 may be formed on various currently known substrates (for example, a glass substrate).

The first electrode 2 of the transistor 1 may be a source electrode, and the second electrode 4 may be a drain electrode. A threshold voltage of the transistor 1 may be changed by a body effect. The body effect means that the threshold voltage of the transistor 1 is changed due to a voltage difference between the source electrode 2 and the body electrode 8 of the transistor. For example, as the voltage difference between the source electrode 2 and the body electrode 8 (for example, $V_{sb}$) increases, the threshold voltage of the transistor 1 may increase.

Therefore, when the transistor 1 including the body electrode 8 is formed as a driving transistor of a pixel, the source electrode 2 and the body electrode 8 of the transistor 1 are required to be set to the same voltage during a threshold voltage compensation period and an emission period.

However, in most currently known pixels, different voltages are supplied to the first electrode of the transistor 1 during the threshold voltage compensation period and the emission period. In this case, a threshold voltage of a driving transistor in the threshold voltage compensation period and the threshold voltage of the driving transistor in the emission period may be different, and thus luminance different from target luminance may be displayed in a pixel.

Therefore, in an embodiment of the disclosure, a pixel capable of compensating for a threshold voltage while using the transistor 1 including the body electrode 8 as the driving transistor is proposed.

Additionally, in an embodiment of the disclosure, a pixel that does not include the body electrode 8 and is applicable to high resolution is proposed.

Figure 2:
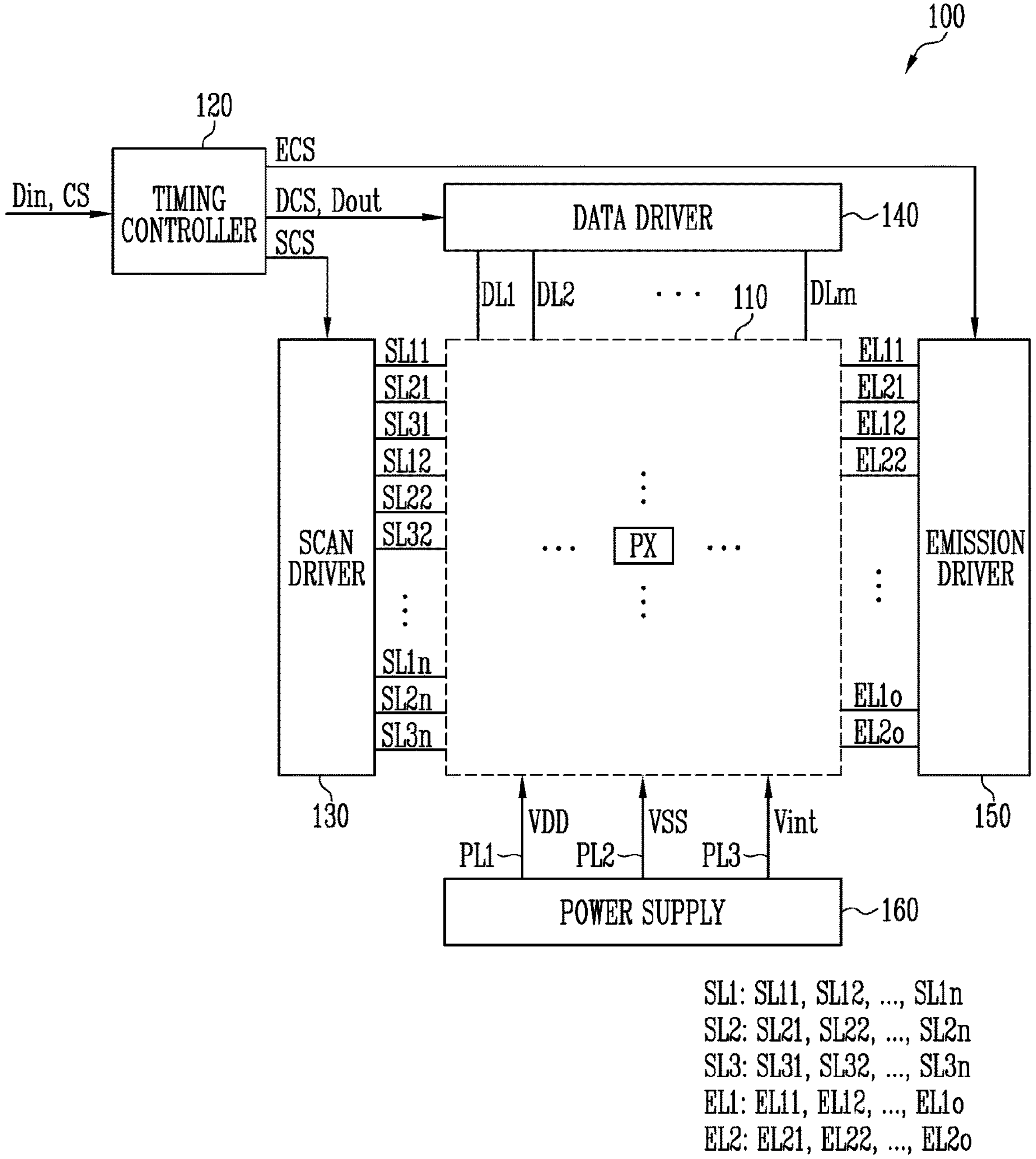
FIG. 2 is a diagram illustrating a display device according to an embodiment of the disclosure.
Figure 3:
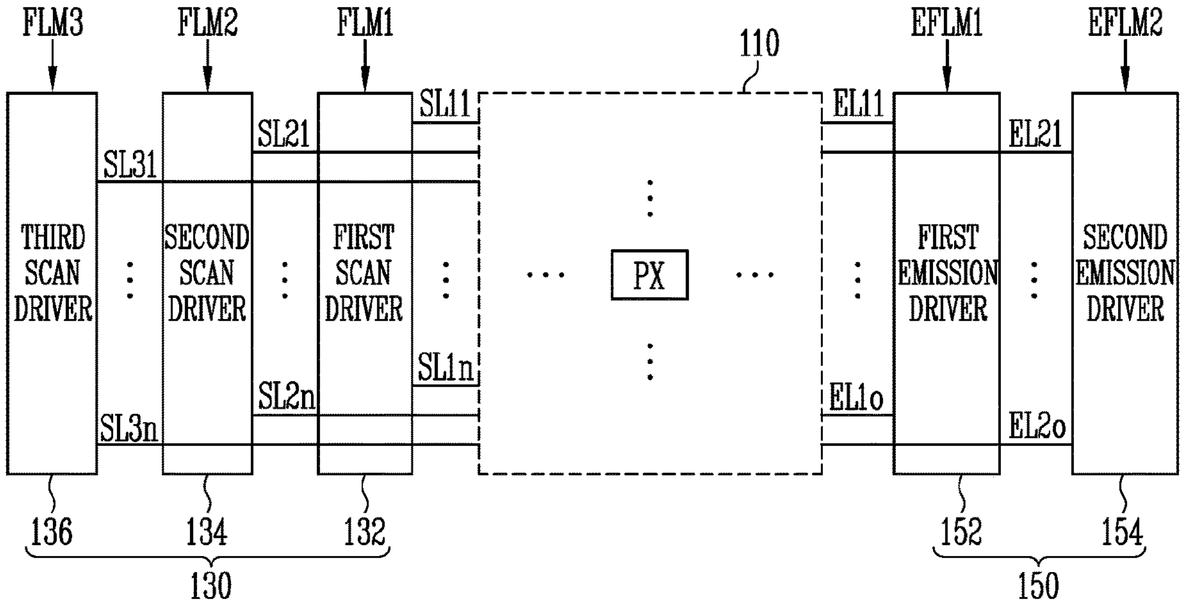
FIG. 3 is a diagram illustrating an embodiment of a scan driver and an emission driver shown in FIG. 2.

FIG. 2 is a diagram illustrating a display device according to an embodiment of the disclosure. FIG. 3 is a diagram illustrating an embodiment of a scan driver and an emission driver shown in FIG. 2.

Referring to FIG. 2, the display device 100 according to an embodiment of the disclosure may include a pixel unit 110 (or a panel), a timing controller 120, a scan driver 130, a data driver 140, an emission driver 150, and a power supply 160. The above-described configurations may be implemented as separate integrated circuits, and two or more configurations among the above-described configurations may be integrated into one integrated circuit chip.

The pixel unit 110 may include pixels PX connected to first scan lines SL11, SL12, . . . , and SL1*n*, second scan lines SL21, SL22, . . . , and SL2*n*, third scan lines SL31, SL32, . . . , SL3*n*, data lines DL1, DL2, . . . , and DLm, first emission control lines EL11, EL12, . . . , and EL1*o*, second emission control lines EL21, EL22, . . . , and EL20, and power lines PL1, PL2, and PL3 (where n, m, o are integers greater than or equal to 0).

For example, pixels PXija, PXijb, and PXijc (refer to FIGS. 4A, 4B, and 4C) positioned on an i-th horizontal line (or pixel row) and a j-th vertical line (or pixel column) may be connected to an i-th first scan line SL1*i*, an i-th second scan line SL2*i*, an i-th third scan line SL3*i*, a k-th first emission control line EL1*k*, a k-th second emission control line EL2, and a j-th data line DLj (where i is an integer less than or equal to n, j is an integer less than or equal to n, and k is an integer less than or equal to o). Here, k may be a number equal to or less than i. For example, when each of the emission control lines EL11 to EL1*o* and EL21 to EL20 is connected to pixels PX positioned on one horizontal line, k may be the same number as i. For example, when each of the emission control lines EL11 to EL1*o* and EL21 to EL20 is connected to pixels PX positioned on two or more horizontal lines, k may be a number less than i.

When a first scan signal is supplied to the first scan lines SL11 to SL1*n*, the pixels PX may be selected in a horizontal line unit (for example, the pixels PX connected to the same scan line may be classified as one horizontal line (or pixel row), and the pixels PX selected by the first scan signal may be supplied with a data signal from a data line (any one of DL1 to DLm) connected thereto. The pixels PX receiving the data signal may generate light of a predetermined luminance in response to a voltage of the data signal.

The scan driver 130 may receive a scan driving signal SCS from the timing controller 120. The scan driving signal SCS may include at least one scan start signal and clock signals necessary for driving the scan driver 130. The scan driver 130 may generate the first scan signal, a second scan signal, and a third scan signal while shifting the scan start signal in response to the clock signal.

To this end, the scan driver 130 may include a first scan driver 132, a second scan driver 134, and a third scan driver 136 as shown in FIG. 3.

The first scan driver 132 may receive a first scan start signal FLM1 and generate the first scan signal while shifting the first scan start signal FLM1 in response to the clock signal. The first scan driver 132 may sequentially supply the first scan signal to the first scan lines SL11 to SL1*n*.

The second scan driver 134 may receive a second scan start signal FLM2 and generate the second scan signal while shifting the second scan start signal FLM2 in response to the clock signal. The second scan driver 134 may sequentially supply the second scan signal to the second scan lines SL21 to SL2*n*.

The third scan driver 136 may receive a third scan start signal FLM3 and generate the third scan signal while shifting the third scan start signal FLM3 in response to the clock signal. The third scan driver 136 may sequentially supply the third scan signal to the third scan lines SL31 to SL3*n*. The first scan signal, the second scan signal, and the third scan signal may be set to a gate-on voltage so that a transistor included in the pixels PX is turned on.

For example, a first scan signal, a second scan signal, and a third scan signal of a low level may be supplied to a P-type transistor, and a first scan signal, a second scan signal, and a third scan signal of a high level may be supplied to an N-type transistor. A transistor receiving the first scan signal, the second scan signal, or the third scan signal may be turned on in response to the first scan signal, the second scan signal, or the third scan signal. Hereinafter, the first scan signal, the second scan signal, or the third scan signal is supplied may mean that a gate-on voltage is supplied to a first scan line SL1, a second scan line SL2, or a third scan line SL3. In addition, the first scan signal, the second scan signal, or the third scan signal is not supplied may mean that a gate-off voltage is supplied to the first scan line SL1, the second scan line SL2, or the third scan line SL3.

In FIG. 3, the first scan driver 132, the second scan driver 134, and the third scan driver 136 are connected to the first scan line SL1, the second scan line SL2, and the third scan line SL3, respectively, but an embodiment of the disclosure is not limited thereto. For example, at least two scan lines (at least two of SL1, SL2, and SL3) among the first scan line SL1, second scan line SL2, and third scan line SL3 may be driven by one scan driver.

The data driver 140 may receive output data Dout and a data driving signal DCS from the timing controller 120. The data driving signal DCS may include a sampling signal and/or timing signals necessary for driving the data driver 140. The data driver 140 may generate a data signal based on the data driving signal DCS and the output data Dout. For example, the data driver 140 may generate an analog data signal based on a grayscale of the output data Dout. The data driver 140 may sequentially supply a voltage of reference power Vref and a voltage of the data signal Vdata to the data lines DL1 to DLm during one horizontal period 1H (refer to FIG. 5). The reference power Vref may be set to a constant voltage.

The emission driver 150 may receive an emission driving signal ECS from the timing controller 120. The emission driving signal ECS may include an emission start signal and clock signals necessary for driving the emission driver 150. The emission driver 150 may generate a first emission control signal and a second emission control signal while shifting the emission start signal in response to the clock signal.

To this end, the emission driver 150 may include a first emission driver 152 and a second emission driver 154 as shown in FIG. 3.

The first emission driver 152 may receive a first emission start signal EFLM1 and generate a first emission control signal while shifting the first emission start signal EFLM1 in response to the clock signal. The first emission driver 152 may sequentially supply the first emission control signal to the first emission control lines EL11 to EL1*o*.

The second emission driver 154 may receive a second emission start signal EFLM2 and generate a second emission control signal while shifting the second emission start signal EFLM2 in response to the clock signal. The second emission driver 154 may sequentially supply the second emission control signal to the second emission control lines EL21 to EL20. The first emission control signal and the second emission control signal may be set to a gate-off voltage so that the transistor included in the pixels PX may be turned off.

For example, a first emission control signal and a second emission control signal of a high level may be supplied to a P-type transistor, and a first emission control signal and a second emission control signal of a low level may be supplied to an N-type transistor. A transistor receiving the first emission control signal or the second emission control signal may be turned off in response to the first emission control signal or the second emission control signal. Hereinafter, the first emission control signal or the second emission control signal is supplied may mean that a gate-off voltage is supplied to a first emission control line EL1 or a second emission control line EL2. The first emission control signal or the second emission control signal is not supplied may mean that a gate-on voltage is supplied to the first emission control line EL1 or the second emission control line EL2.

In FIG. 3, the first emission driver 152 and the second emission driver 154 are connected to the first emission control line EL1 and the second emission control line EL2, respectively, but an embodiment of the disclosure is not limited thereto. For example, the first emission control line EL1 and the second emission control line EL2 may be driven by one emission driver.

The timing controller 120 may receive input data Din and a control signal CS from a host system through an interface. For example, the timing controller 120 may receive the input data Din and the control signal CS from at least one of a graphics processing unit (GPU), a central processing unit (CPU), and an application processor (AP) included in the host system. The control signal CS may include various signals including the clock signal.

The timing controller 120 may generate the scan driving signal SCS, the data driving signal DCS, and the emission driving signal ECS based on the control signal CS. The scan driving signal SCS, the data driving signal DCS, and the emission driving signals ECS may be supplied to the scan driver 130, the data driver 140, and the emission driver 150, respectively.

The timing controller 120 may rearrange the input data Din according to a specification of the display device 100. In addition, the timing controller 120 may correct the input data Din to generate the output data Dout, and supply the output data Dout to the data driver 140. In an embodiment, the timing controller 120 may correct the input data Din in response to an optical measurement result measured in a process.

The power supply 160 may generate various power necessary for driving the display device 100. For example, the power supply 160 may generate first driving power VDD, second driving power VSS, and initialization power Vint.

The first driving power VDD may be power supplying a driving current to the pixels PX. The second driving power VSS may be power receiving the driving current from the pixels PX. During a period in which the pixels PX are set to an emission state, the first driving power VDD may be set to a voltage higher than that of the second driving power VSS.

The initialization power Vint may be a voltage for initializing a first electrode (or an anode electrode) of a light emitting element LD (refer to FIG. 4A) included in each of the pixels PX. The initialization power Vint may have a voltage value at which the light emitting element LD is turned off when the initialization power Vint is supplied to the first electrode of the light emitting element LD. For example, the initialization power Vint may be set to a ground potential GND.

The first driving power VDD generated by the power supply 160 may be supplied to a first power line PL1, the second driving power VSS may be supplied to a second power line PL2, and the initialization power Vint may be supplied to a third power line PL3. The first power line PL1, the second power line PL2, and the third power line PL3 may be commonly connected to the pixels PX, but an embodiment of the disclosure is not limited thereto.

In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. In an embodiment, the third power line PL3 may include a plurality of power lines, and the plurality of power lines may be connected to different pixels PX. That is, in an embodiment of the disclosure, the pixels PX may be connected to any one of the first power line PL1, any one of the second power line PL2, and any one of the third power line PL3.

Figure 4A:
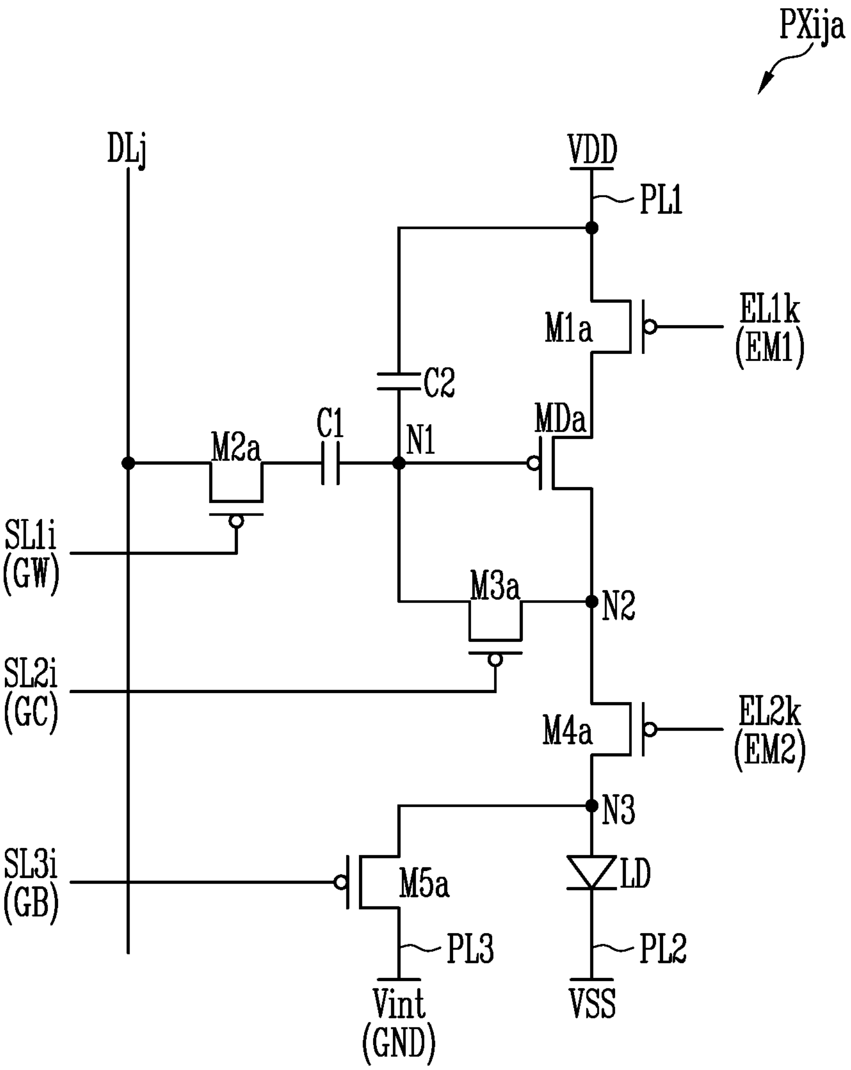
FIGS. 4A, 4B and 4C are diagrams illustrating an embodiment of a pixel shown in FIG. 2.
Figure 4B:
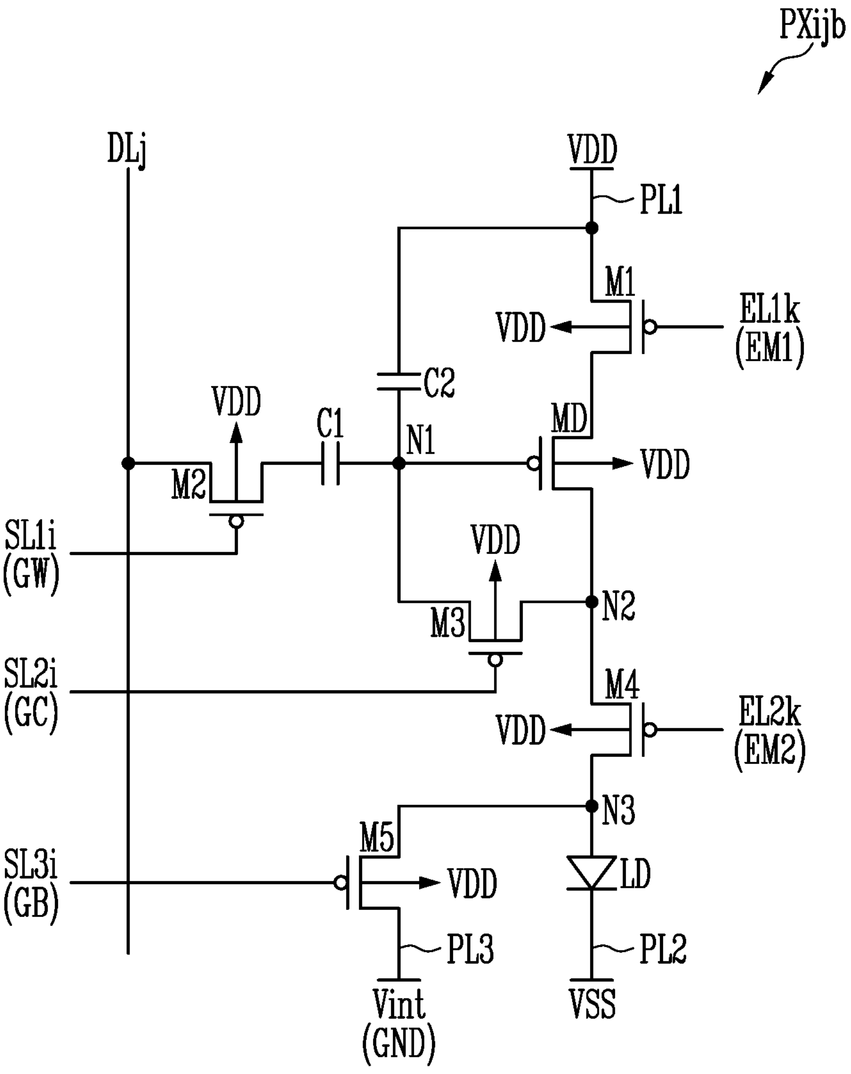
Figure 4C:
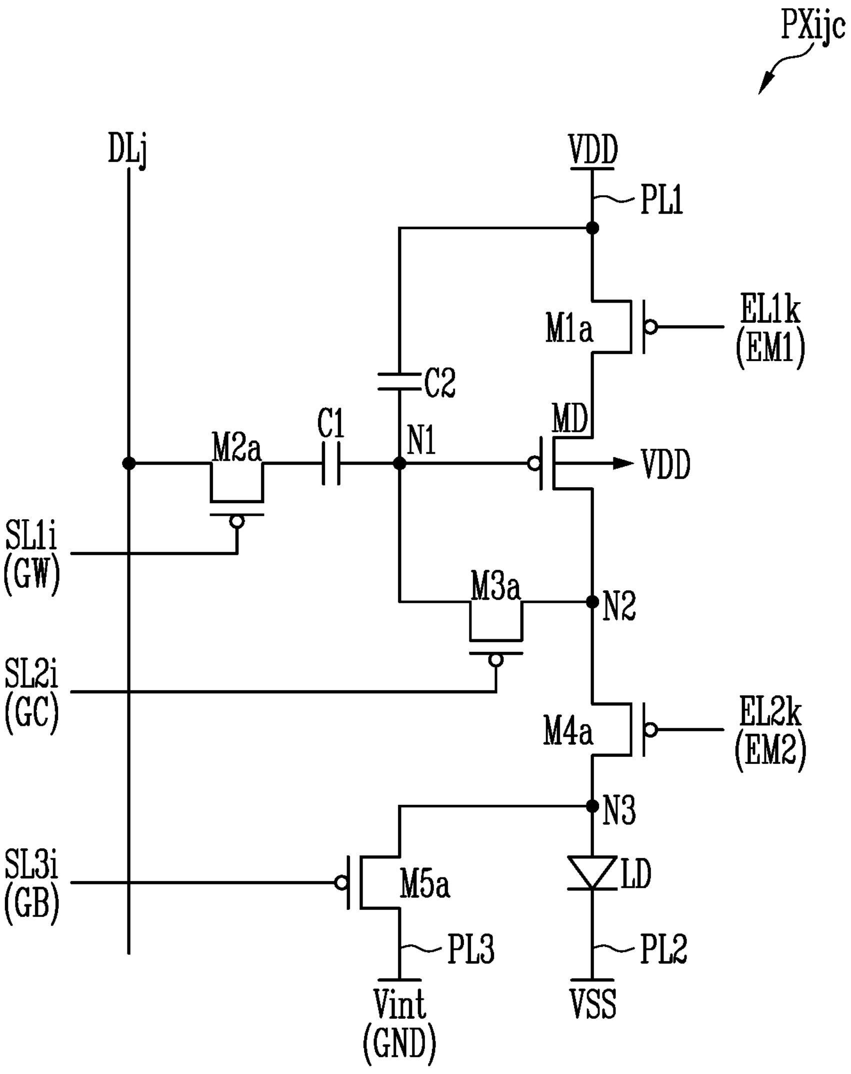

FIGS. 4A to 4C are diagrams illustrating an embodiment of the pixel shown in FIG. 2. In FIGS. 4A to 4C, the pixel positioned on the i-th horizontal line and the j-th vertical line is shown.

Referring to FIG. 4A, the pixel PXija according to an embodiment of the disclosure may be connected to corresponding signal lines SL1*i*, SL2*i*, SL3*i*, EL1*k*, EL2*k*, and DLj. For example, the pixel PXija may be connected to an i-th first scan line SL1*i*, an i-th second scan line SL2*i*, an i-th third scan line SL3*i*, a k-th first emission control line EL1*k*, a k-th second emission control line EL2*k*, and a j-th data line DLj. In an embodiment, the pixel PXija may be further connected to the first power line PL1, the second power line PL2, and the third power line PL3.

The pixel PXija according to an embodiment of the disclosure may include the light emitting element LD and a pixel circuit for controlling a current amount supplied to the light emitting element LD.

The light emitting element LD may be connected between the first power line PL1 and the second power line PL2. For example, a first electrode (or an anode electrode) of the light emitting element LD may be electrically connected to the first power line PL1 via a third node N3, a fourth transistor M4*a*, a second node N2, a driving transistor MDa, and a first transistor M1*a*, and a second electrode (or a cathode electrode) of the light emitting element LD may be electrically connected to the second power line PL2. The light emitting element LD may generate light of a predetermined luminance in response to a current amount supplied from the first power line PL1 to the second power line PL2 via the pixel circuit.

The light emitting element LD may be an organic light emitting diode. In addition, the light emitting element LD may be an inorganic light emitting diode such as a micro light emitting diode (LED) or a quantum dot light emitting diode. In addition, the light emitting element LD may be an element in which an organic material and an inorganic material are combined. Although the pixel PXija is shown as including a single light emitting element LD in FIG. 4A, in another embodiment, the pixel PXija may include a plurality of light emitting elements LD, and the plurality of light emitting elements LD may be connected in series, parallel, or series-parallel to each other.

The pixel circuit may include a driving transistor MDa, a first transistor M1*a*, a second transistor M2*a*, a third transistor M3*a*, a fourth transistor M4*a*, a fifth transistor M5*a*, and a first capacitor C1, and a second capacitor C2.

In an embodiment, the transistors MDa and M1*a* to M5*a* may be formed of various types of currently known transistors. For example, the transistors MDa and M1*a* to M5*a* may be formed of thin film transistors (TFTs), field effect transistors (FETs), bipolar junction transistors (BJTs), and the like.

In an embodiment, the driving transistor MDa and the first to fifth transistors M1*a* to M5*a* may be formed as P-type transistors. However, this is exemplary, and at least one of the driving transistor MDa and the first to fifth transistors M1*a* to M5*a* may be replaced with an N-type transistor.

A first electrode of the driving transistor MDa may be connected to a second electrode of the first transistor M1*a*, and a second electrode may be connected to a second node N2. Here, being connected includes a meaning of being electrically connected. A gate electrode of the driving transistor MDa may be connected to a first node N1. The driving transistor MDa may control the current amount supplied from the first driving power VDD to the second driving power VSS via the light emitting element LD in response to a voltage of the first node N1.

A first electrode of the first transistor M1*a* may be electrically connected to the first power line PL1, and a second electrode may be connected to the first electrode of the driving transistor MDa. In addition, a gate electrode of the first transistor M1*a* may be electrically connected to a first emission control line EL1*k*. The first transistor M1*a* may be turned off when a first emission control signal EM1 is supplied to the first emission control line EL1*k*, and turned on when the first emission control signal EM1 is not supplied. When the first transistor M1*a* is turned off, the first power line PL1 and the driving transistor MDa may be electrically cut off.

The second transistor M2*a* may be connected between the data line DLj and a first electrode of the first capacitor C1. In addition, a gate electrode of the second transistor M2*a* may be electrically connected to the first scan line SL1*i*. The second transistor M2*a* may be turned on when the first scan signal GW is supplied to the first scan line SL1*i* to electrically connect the data line DLj and the first electrode of the first capacitor C1.

The third transistor M3*a* may be connected between the first node N1 and the second node N2. In addition, a gate electrode of the third transistor M3*a* may be electrically connected to the second scan line SL2*i*. The third transistor M3*a* may be turned on when the second scan signal GC is supplied to the second scan line SL2*i* to electrically connect the first node N1 and the second node N2. In this case, the gate electrode (that is, the first node N1) and the second electrode (that is, the second node N2) of the driving transistor MDa may be electrically connected, and thus the driving transistor MDa may be connected in a diode form.

The fourth transistor M4*a* may be connected between the second node N2 and a third node N3 (that is, the first electrode of the light emitting element LD). In addition, a gate electrode of the fourth transistor M4*a* may be electrically connected to the second emission control line EL2*k*. The fourth transistor M4*a* may be turned off when a second emission control signal EM2 is supplied to the second emission control line EL2*k*, and turned on when the second emission control signal EM2 is not supplied. When the fourth transistor M4*a* is turned off, the driving transistor MDa and the light emitting element LD may be electrically cut off.

A first electrode of the fifth transistor M5*a* may be connected to the third node N3, and the second electrode may be electrically connected to the third power line PL3. In addition, a gate electrode of the fifth transistor M5*a* may be electrically connected to the third scan line SL3*i*. The fifth transistor M5*a* may be turned on when the third scan signal GB is supplied to the third scan line SL3*i*. When the fifth transistor M5*a* is turned on, the voltage of the initialization power Vint may be supplied to the third node N3. Here, the initialization power Vint may be set to the ground potential GND.

The first electrode of the first capacitor C1 may be connected to a second electrode of the second transistor M2*a*, and a second electrode may be connected to the first node N1. The first capacitor C1 may change a voltage of the first node N1 in response to a voltage supplied from the second transistor M2*a*. For example, the first capacitor C1 may be driven as a coupling capacitor.

A first electrode of the second capacitor C2 may be electrically connected to the first power line PL1, and a second electrode may be connected to the first node N1. That is, the second capacitor C2 may be connected between the first power line PL1 and the first node N1. The second capacitor C2 may store the voltage of the first node N1.

Referring to FIG. 4B, a pixel PXijb according to an embodiment of the disclosure may be connected to corresponding signal lines SL1*i*, SL2*i*, SL3*i*, EL1*k*, EL2*k*, and DLj. In an embodiment, the pixel PXijb may be further connected to the first power line PL1, the second power line PL2, and the third power line PL3.

The pixel PXijb according to an embodiment of the disclosure may include a light emitting element LD and a pixel circuit for controlling the current amount supplied to the light emitting element LD.

The light emitting element LD may be connected between the first power line PL1 and the second power line PL2. The light emitting element LD may generate light of a predetermined luminance in response to a current amount supplied from the first power line PL1 to the second power line PL2 via the pixel circuit.

The pixel circuit may include a driving transistor MD, a first transistor M1, a second transistor M2, a third transistor M3, a fourth transistor M4, a fifth transistor M5, a first capacitor C1, and a second capacitor C2.

In an embodiment, the driving transistor MD and the first to fifth transistors M1 to M5 may be MOSFETs including a body electrode. In this case, the driving transistor MD and the first to fifth transistors M1 to M5 may occupy a small area, and thus the pixel PXijb may be applied to a high-resolution panel.

In an embodiment, the body electrode of the driving transistor MD and the first to fifth transistors M1 to M5 may receive the first driving power VDD. For example, the body electrode of the driving transistor MD and the first to fifth transistors M1 to M5 may be electrically connected to the first power line PL1. In an embodiment, the body electrode of the driving transistor MD and the first to fifth transistors M1 to M5 may receive separate power in addition to the first driving power VDD.

Except that the pixel PXijb of FIG. 4B includes the body electrode of the driving transistor MD and the first to fifth transistors M1 to M5, a connection relationship and the like is substantially the same as the pixel PXija of FIG. 4A. Accordingly, a detailed description is omitted.

Referring to FIG. 4C, a pixel PXijc according to an embodiment of the disclosure may be connected to corresponding signal lines SL1*i*, SL2*i*, SL3*i*, EL1*k*, EL2*k*, and DLj. In an embodiment, the pixel PXijc may be further connected to the first power line PL1, the second power line PL2, and the third power line PL3.

The pixel PXijc according to an embodiment of the disclosure may include a light emitting element LD and a pixel circuit for controlling the current amount supplied to the light emitting element LD.

The light emitting element LD may be connected between the first power line PL1 and the second power line PL2. The light emitting element LD may generate light of a predetermined luminance in response to the current amount supplied from the first power line PL1 to the second power line PL2 via the pixel circuit.

The pixel circuit may include a driving transistor MD, a first transistor M1*a*, a second transistor M2*a*, a third transistor M3*a*, a fourth transistor M4*a*, a fifth transistor M5*a*, a first capacitor C1, and a second capacitor C2.

In an embodiment, as shown in FIG. 4C, the driving transistor MD and the remaining transistors M1*a* to M5*a* may be formed of different types of transistors. For example, the driving transistor MD may be a MOSFET including a body electrode. For example, the first to fifth transistors M1*a* to M5*a* may be transistors that do not include a body electrode. For example, the first to fifth transistors M1*a* to M5*a* may be configured in various forms such as thin film transistors (TFTs), field effect transistors (FETs), and bipolar junction transistors (BJTs).

The pixel PXijc of FIG. 4C has substantially the same connection relationship and the like as the pixel PXija of FIG. 4A except that the driving transistor MD includes the body electrode. Accordingly, a detailed description is omitted.

Figure 5:
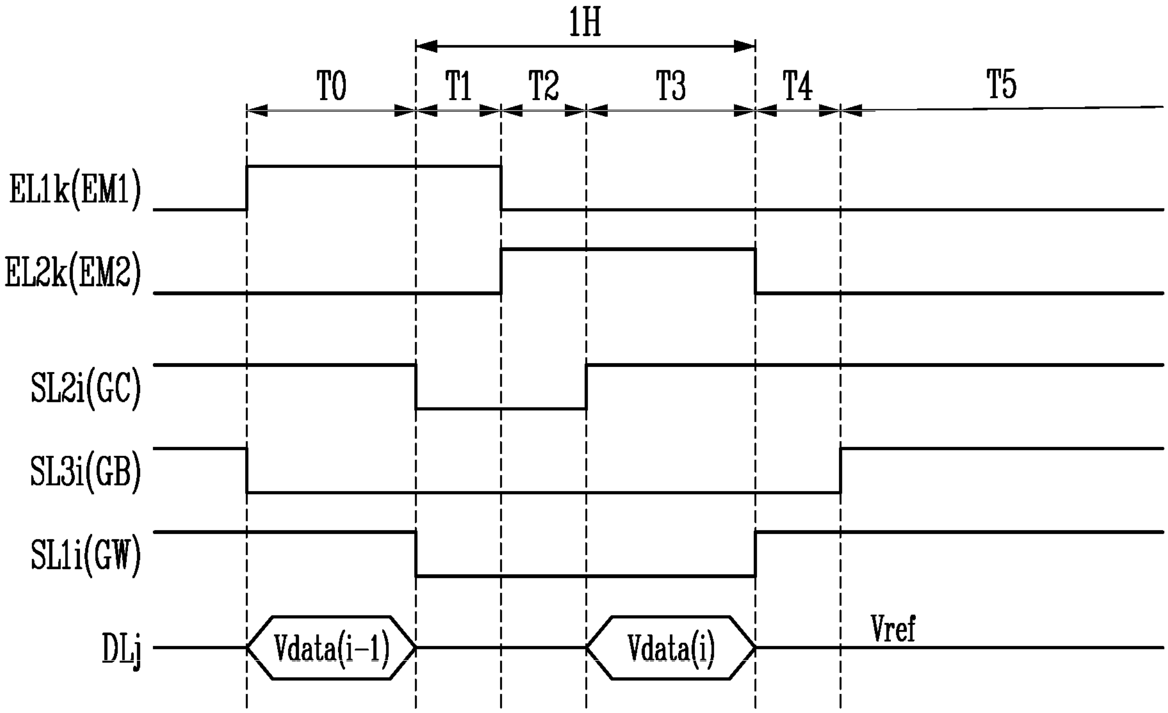
FIG. 5 is a waveform diagram illustrating an embodiment of a method of driving the pixel shown in FIGS. 4A to 4C.

FIG. 5 is a waveform diagram illustrating an embodiment of a method of driving the pixel shown in FIGS. 4A to 4C.

Referring to FIG. 5, a horizontal period 1H (or a specific horizontal period) may include a first period T1, a second period T2, and a third period T3.

The data driver 140 may supply the voltage of the reference power Vref to the data line DLj during the first period T1 and the second period T2, and supply a voltage Vdata(i) of the data signal during the third period T3. The reference power Vref may be set to a voltage between the first driving power VDD and the second driving power VSS, for example, a specific voltage within a voltage range of the data signal. The voltage of the data signal Vdata(i) may be set to a predetermined voltage within a voltage range of the data signal in correspondence with a grayscale.

The scan driver 130 (or the first scan driver 132) may supply the first scan signal GW to the first scan line SL1*i* during the first to third periods T1 to T3.

The scan driver 130 (or the second scan driver 134) may supply the second scan signal GC to the second scan line SL2*i* during the first period T1 and the second period T2.

The scan driver 130 (or the third scan driver 136) may supply the third scan signal GB to the third scan line SL3*i* during a 0-th period T0 precedent the first period T1 to a fourth period T4 following the third period T3. The 0-th period T0 may be a previous data writing period (for example, a period in which the data signal is supplied to pixels positioned on an (i−1)-th horizontal line). The fourth period T4 may be a luminance control period in which current flowing through the driving transistor MD is bypassed to the third power line PL3.

The emission driver 150 (or the first emission driver 152) may supply the first emission control signal to the first emission control line EL1*k* during the 0-th period T0 and the first period T1.

The emission driver 150 (or the second emission driver 154) may supply the second emission control signal to the second emission control line EL2*k* during the second period T2 and the third period T3.

The 0-th period T0 is a period in which the voltage of the initialization power Vint is supplied to the second node N2 and the third node N3. During the 0-th period T0, the first electrode of the light emitting element LD may be initialized to the voltage of the initialization power Vint. The 0-th period T0 may be referred to as a first initialization period.

The first period T1 is a period in which the voltage of the initialization power Vint is supplied to the first node N1, the second node N2, and the third node N3, and the voltage of the reference power Vref is applied to the first electrode of the first capacitor C1. During the first period T1, the first capacitor C1 may be initialized by the voltages of the reference power Vref and the initialization power Vint. The first period T1 may be referred to as a second initialization period. During the first period T1, the first capacitor may be charged with a voltage difference between the reference voltage Vref and the initialization voltage Vint, and the second capacitor may be charged with a voltage difference between the first driving power VDD and the initialization voltage Vint.

The second period T2 is a period in which a voltage corresponding to a threshold voltage of the driving transistor MD is stored in the second capacitor C2. The second period T2 may be referred to as a threshold voltage compensation period.

The third period T3 is a period in which the voltage Vdata(i) of the data signal is supplied from the data line DLj to the pixels PXija, PXijb, and PXijc. The voltage corresponding to the data signal may be applied to the first node N1 during the third period T3. The third period T3 may be referred to as a data writing period.

During the fourth period T4, the driving transistor MD controls a current amount supplied from the first driving power VDD to the initialization power Vint in response to the voltage of the first node N1. In this case, an unnecessary current may be prevented from being supplied to the light emitting element LD after the third period T3. The fourth period T4 may be referred to as a luminance control period.

During a fifth period T5, the driving transistor MD controls the current amount supplied from the first driving power VDD to the second driving power VSS via the light emitting element LD in response to the voltage of the first node N1. In this case, during the fifth period T5, the light emitting element LD may emit light with a luminance corresponding to the current flowing through the light emitting element LD. The fifth period T5 may be referred to as an emission period.

FIGS. 6A to 6F are diagrams illustrating an embodiment of an operation process of the pixel corresponding to a driving waveform of FIG. 5. When describing FIGS. 6A to 6F, the operation process is described using the pixel PXijb shown in FIG. 4B.

Figure 6A:
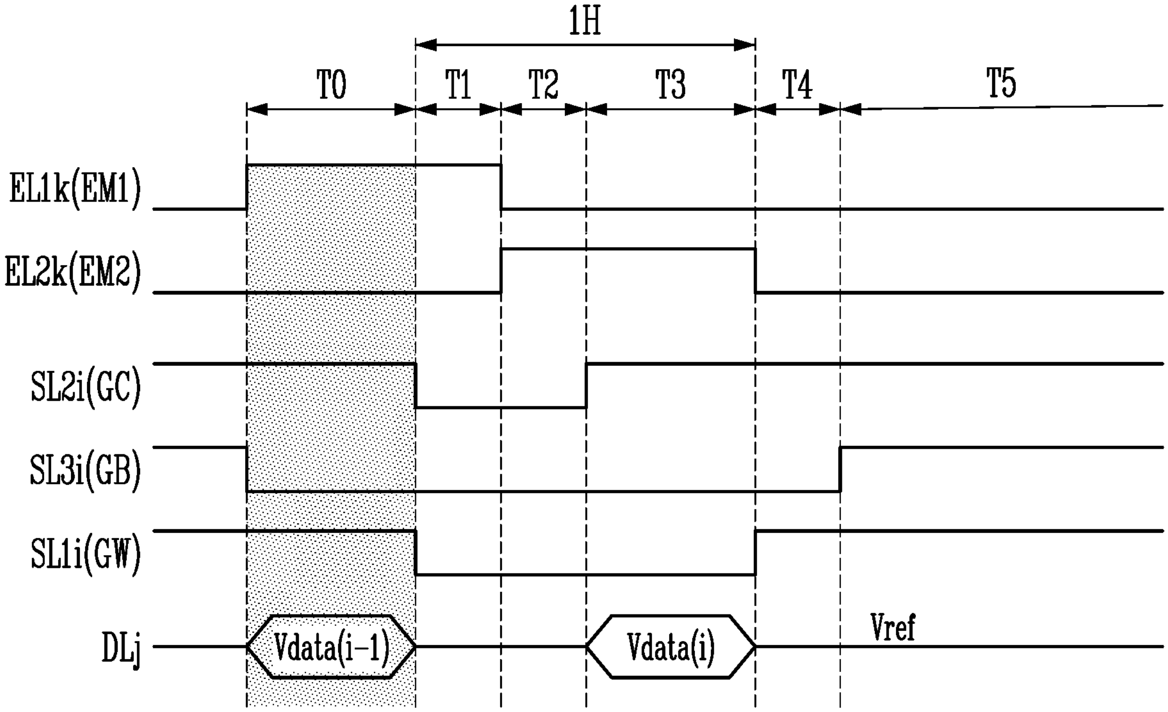
FIGS. 6A, 6B, 6C, 6D, 6E and 6F are diagrams illustrating an embodiment of an operation process of the pixel corresponding to a driving waveform of FIG. 5.
Figure 6A:
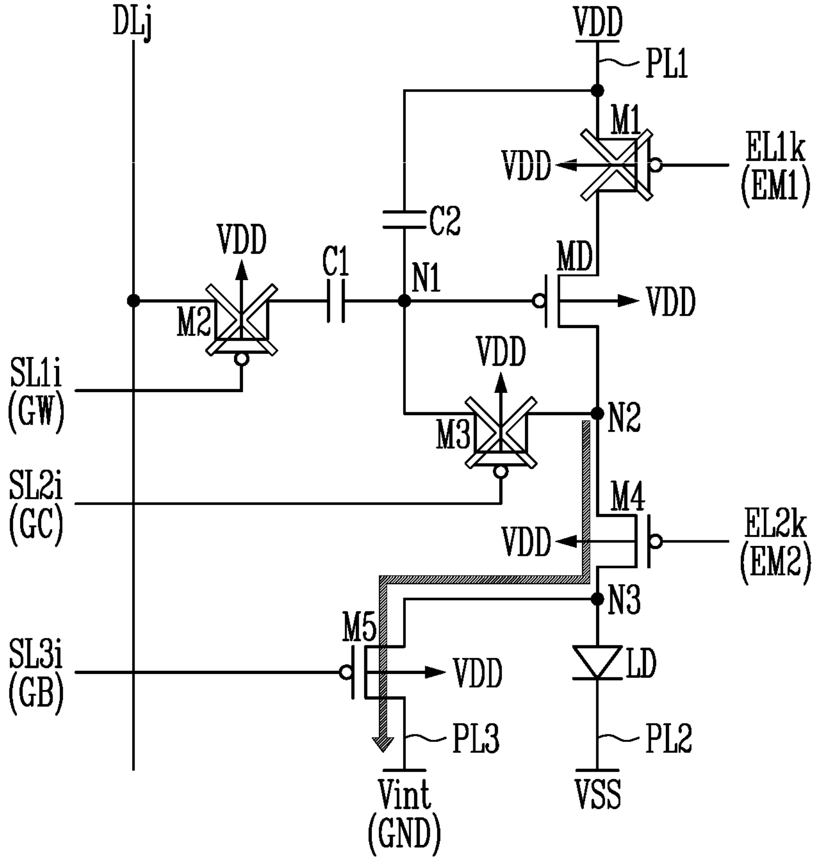

Referring to FIG. 6A, the first emission control signal EM1 is supplied to the first emission control line EL1*k* during the 0-th period T0, and thus the first transistor M1 is turned off.

During the 0-th period T0, the third scan signal GB is supplied to the third scan line SL3*i*, and thus the fifth transistor M5 is turned on. When the fifth transistor M5 is turned on, the voltage of the initialization power Vint may be supplied to the third node N3 and the second node N2.

When the voltage of the initialization power Vint is supplied to the third node N3, the first electrode of the light emitting element LD may be initialized by the voltage of the initialization power Vint. Here, the initialization power Vint may be set to a voltage at which the light emitting element LD does not emit light, and thus the light emitting element LD may be set to a non-emission state. For example, a voltage value obtained by subtracting the second driving power VSS from a voltage obtained by adding an absolute value threshold voltage of the fifth transistor M5 to the voltage of the initialization power Vint may be set to a voltage lower than a threshold voltage of the light emitting element LD. For example, the initialization power Vint may be set to the ground potential GND.

Meanwhile, during the 0-th period T0, the second transistor M2 is set to a turn-off state, and thus a voltage Vdata(i−1) of a data signal corresponding to a previous horizontal line is not supplied to the pixel PXijb.

Figure 6B:
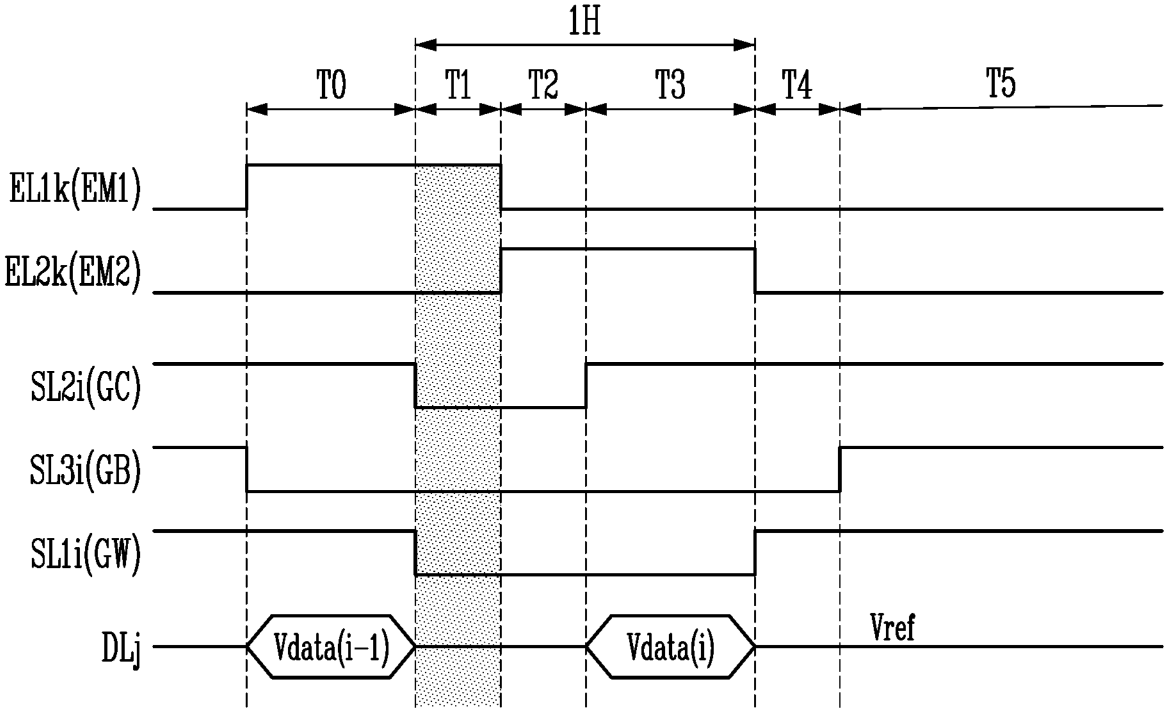
Figure 6B:
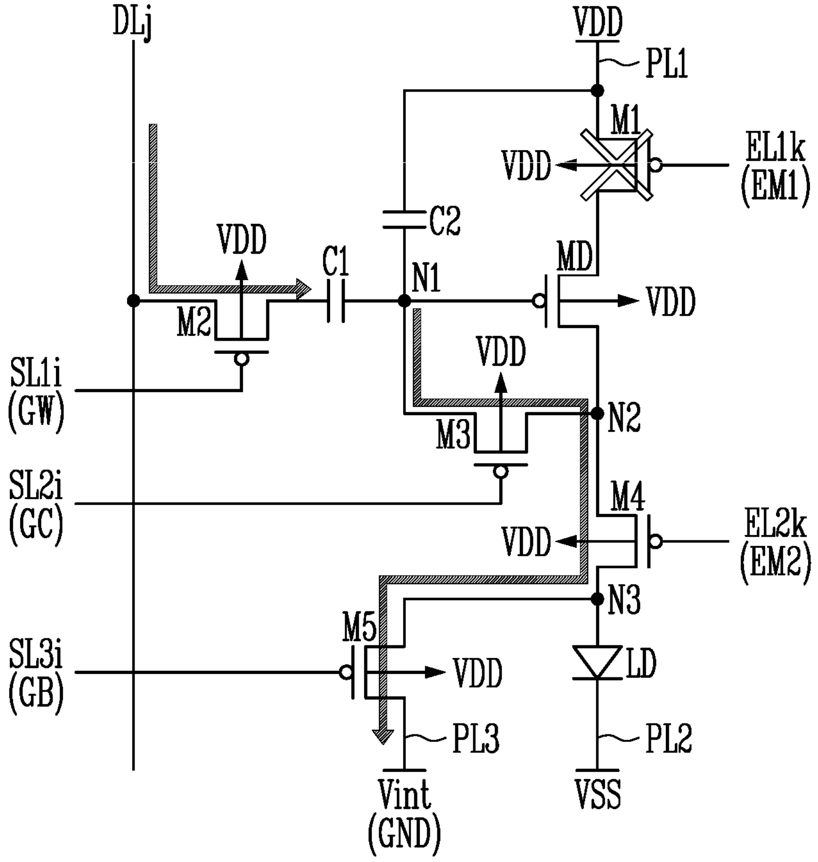

Referring to FIG. 6B, during the first period T1, the first emission control signal EM1 is supplied to the first emission control line EL1*k*, and thus the first transistor M1 is turned off.

During the first period T1, the first scan signal GW is supplied to the first scan line SL1*i*, the second scan signal GC is supplied to the second scan line SL2*i*, and the third scan signal GB is supplied to the third scan line SL3*i*.

When the first scan signal GW is supplied to the first scan line SL1*i*, the second transistor M2 is turned on. When the second transistor M2 is turned on, the data line DLj and the first electrode of the first capacitor C1 are electrically connected.

When the second scan signal GC is supplied to the second scan line SL2*i*, the third transistor M3 is turned on. When the third transistor M3 is turned on, the first node N1 and the second node N2 are electrically connected.

When the third scan signal GB is supplied to the third scan line SL3*i*, the fifth transistor M5 is turned on. When the fifth transistor M5 is turned on, the third power line PL3 and the third node N3 are electrically connected.

During the first period T1, the voltage of the reference power Vref may be supplied to the first electrode of the first capacitor C1, and the voltage of the initialization power Vint may be supplied to the first node N1. In this case, the first capacitor C1 may be initialized by the reference power Vref and the initialization power Vint regardless of a voltage supplied in a previous period (or a previous frame period). Similarly, the second capacitor C2 may be initialized by the initialization power Vint and the first driving power VDD regardless of the voltage supplied in the previous period (or the previous frame period).

Additionally, the voltage of the initialization power Vint applied to the first node N1 (or a voltage obtained by adding the absolute value threshold voltage of the fifth transistor M5 to the initialization power Vint) may be set to a voltage lower than the first driving power VDD. For example, the voltage of the initialization power Vint may be set to a voltage at which the driving transistor MD may be turned on when the voltage of the first driving power VDD is applied to the first electrode of the driving transistor MD.

Figure 6C:
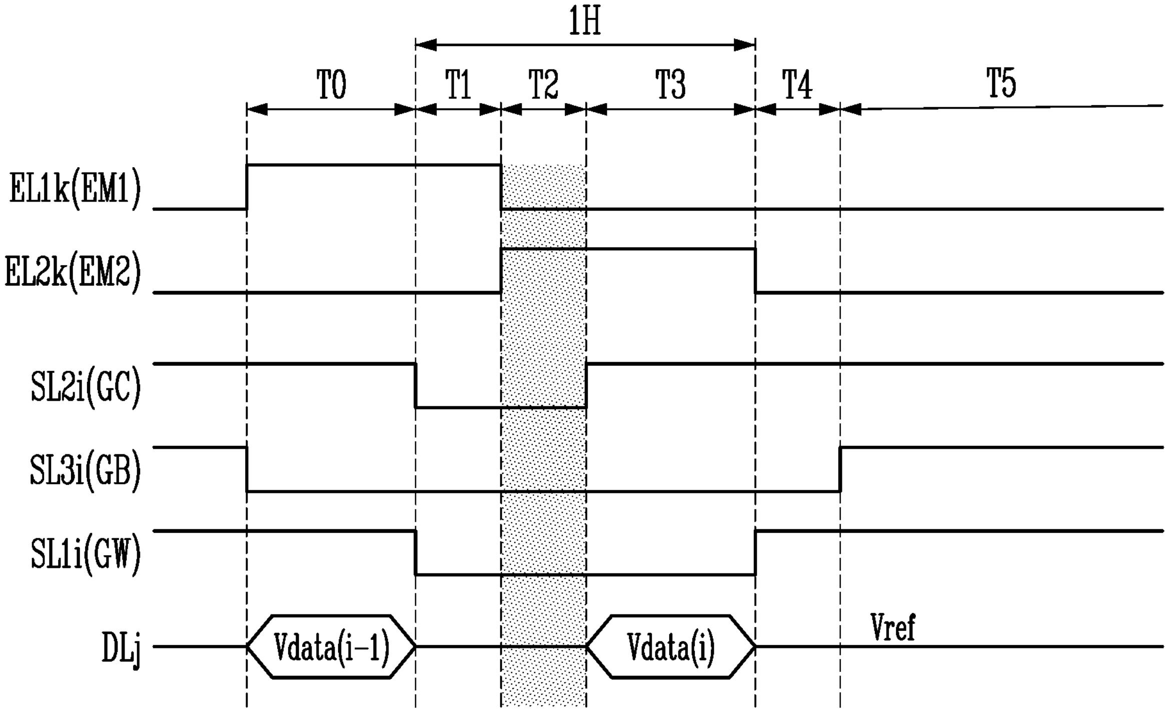
Figure 6C:
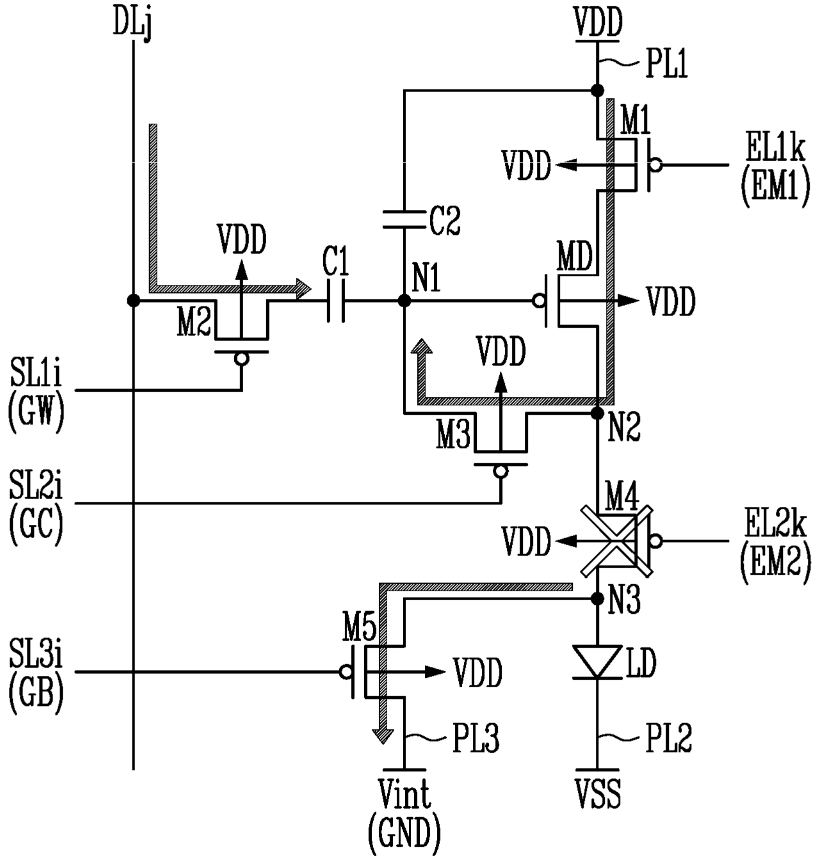

Referring to FIG. 6C, during the second period T2, the second emission control signal is supplied to the second emission control line EL2*k*, and thus the fourth transistor M4 is turned off.

During the second period T2, the second transistor M2 is turned on by the first scan signal GW supplied to the first scan line SL1*i*, the third transistor M3 is turned on by the second scan signal GC supplied to the second scan line SL2*i*, and the fifth transistor M5 is turned on by the third scan signal GB supplied to the third scan line SL3*i*.

When the third transistor M3 is turned on, the driving transistor MD is diode connected. During the second period T2, since the first transistor M1 is set to a turn-on state, the voltage of the first driving power VDD is applied to the first electrode of the driving transistor MD. When the voltage of the first driving power VDD is applied to the first electrode of the driving transistor MD, the diode connected driving transistor MD may be turned on, and thus a voltage obtained by subtracting the absolute value threshold voltage of the driving transistor MD from the first driving power VDD may be applied to the first node N1. Thus a voltage corresponding to the threshold voltage of the driving transistor MD may be stored in the second capacitor C2.

During the second period T2, the voltage of the reference power Vref is supplied to the first electrode of the first capacitor C1. Accordingly, during the second period T2, a voltage corresponding to a difference voltage between the reference power Vref and the first node N1 may be stored in the first capacitor C1. Since the fifth transistor M5 maintains the turn-on state during the second period T2, the voltage of the initialization power Vint is applied to the third node N3.

Figure 6D:
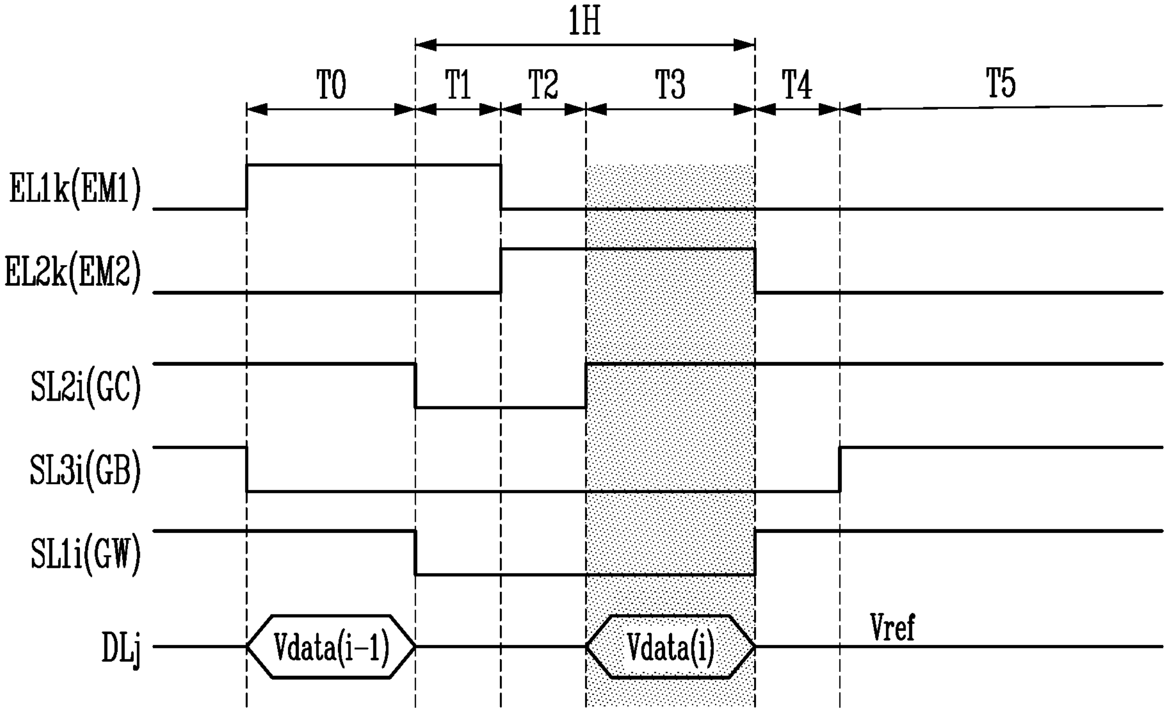
Figure 6D:
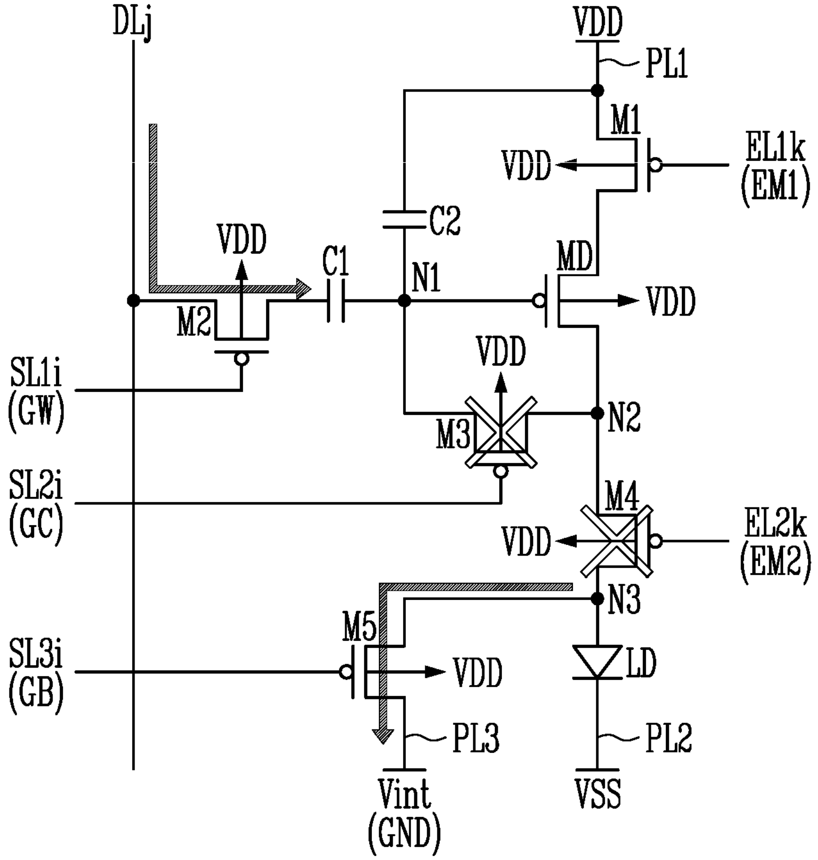

Referring to FIG. 6D, during the third period T3, the second emission control signal EM2 is supplied to the second emission control line EL2*k*, and thus the fourth transistor M4 maintains a turn-off state. In addition, during the third period T3, the first emission control signal EM1 is not supplied to the first emission control line EL1*k*, and thus the first transistor M1 maintains a turn-on state.

During the third period T3, the second transistor M2 maintains a turn-on state by the first scan signal GW supplied to the first scan line SL1*i*, and the fifth transistor M5 maintains a turn-on state by the third scan signal GB supplied to the third scan line SL3*i*.

During the third period T3, the voltage Vdata(i) of the data signal is supplied to the data line DLj. The voltage Vdata(i) of the data signal supplied to the data line DLj is supplied to the first electrode of the first capacitor C1 via the second transistor M2.

When the voltage Vdata(i) of the data signal is supplied to the first electrode of the first capacitor C1, the first electrode of the first capacitor C1 is changed to the voltage Vdata(i) of the data signal from the voltage of the reference power Vref. Thus the voltage of the first node N1 is also changed by coupling of the first capacitor C1.

Here, a voltage change amount of the first node N1 may be determined in correspondence with a ratio of the first capacitor C1 and the second capacitor C2. For example, the voltage of the first node N1 may be changed from the voltage obtained by subtracting the absolute value threshold voltage of the driving transistor MD from the first driving power VDD, by a value obtained by multiplying the voltage change amount of the first capacitor C1 by C1/(C1+C2). When the voltage change amount of the first node N1 described above is controlled by the ratio of the first capacitor C1 and the second capacitor C2, a voltage range of the data signal may be sufficiently wide.

For example, when the data signal is directly supplied to the gate electrode of the driving transistor MD, the voltage range of the data signal is set to be relatively narrow. When the data signal has a narrow voltage range, various grayscales (for example, 256 grayscales) are required to be implemented using the narrow voltage range, and thus accurately expressing a grayscale is difficult.

On the other hand, like an embodiment of the disclosure, when the voltage supplied to the gate electrode of the driving transistor MD is controlled by the ratio of the first capacitor C1 and the second capacitor C2, the voltage range of the data signal may be set sufficiently wide. That is, a voltage corresponding to a value obtained by multiplying the voltage of the data signal by C1/(C1+C2) may be transferred to the gate electrode of the driving transistor MD, and thus the voltage range of the data signal may be set wide. When the data signal has a wide voltage range, a grayscale may be easily implemented.

During the third period T3, the second capacitor C2 stores the voltage of the first node N1. Here, the voltage of the first node N1 may be determined by the threshold voltage of the driving transistor MD and the voltage Vdata(i) of the data signal, and thus a voltage corresponding to the data signal and the threshold voltage of the driving transistor MD may be stored in the second capacitor C2 during the third period T3.

Figure 6E:
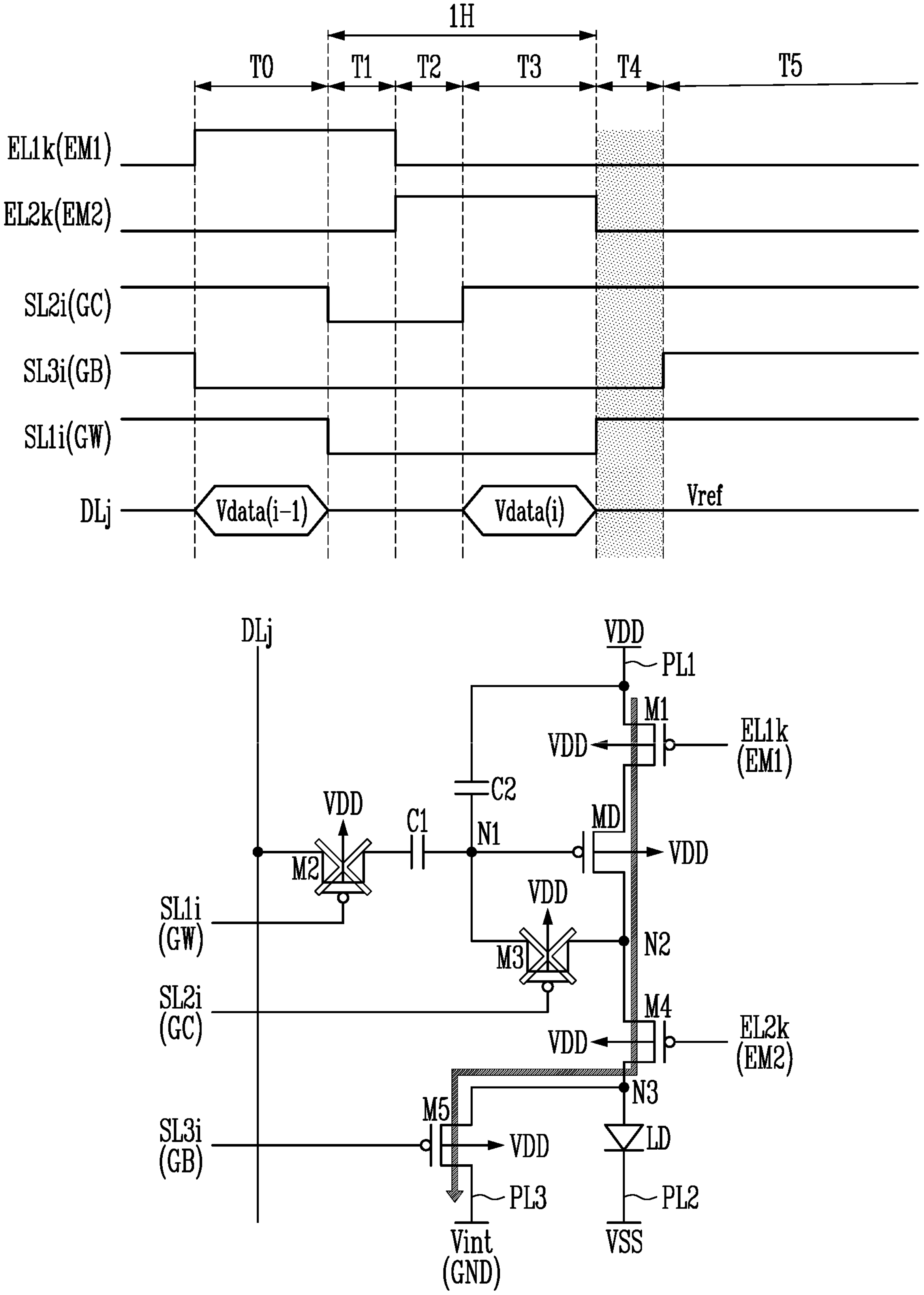

Referring to FIG. 6E, during the fourth period T4, the first emission control signal EM1 is not supplied to the first emission control line EL1*k*, and the second emission control signal EM2 is not supplied to the second emission control line EL2*k*. Therefore, during the fourth period T4, the first transistor M1 and the fourth transistor M4 are set to a turn-on state. During the fourth period T4, the third scan signal GB is supplied to the third scan line SL3*i*, and thus the fifth transistor M5 maintains a turn-on state.

During the fourth period T4, the first transistor M1 and the fourth transistor M4 positioned in a current path for supplying a current to the light emitting element LD are set to a turn-on state, and thus the driving transistor MD controls a current amount supplied from the first driving power VDD to the third node N3 in response to the voltage applied to the first node N1. Since the fifth transistor M5 is set to the turn-on state, a current supplied to the third node N3 may be discharged to the initialization power Vint. That is, during the fourth period T4, the light emitting element LD may be set to the non-emission state and the current flowing through the driving transistor MD may be discharged to the third power line PL3 to stabilize the third node N3, and thus grayscale expression of the display device 100 may be improved.

In detail, a voltage of the second node N2 may be set to approximately the voltage of the first driving power VDD through the second period T2 and the third period T3. When the voltage of the second node N2 is set to approximately the voltage of the first driving power VDD, an unnecessary current may be supplied to the light emitting element LD after the fourth transistor M4 is turned on. For example, even in a case where a black grayscale is implemented in the pixel PXijb, the light emitting element LD may emit light by the voltage of the second node N2. Therefore, in an embodiment of the disclosure, a current supplied from the driving transistor MD may be discharged to the initialization power Vint during the fourth period T4 before the light emitting element LD emits light to stabilize the third node N3, and thus grayscale expression of the display device 100 may be improved.

Figure 6F:
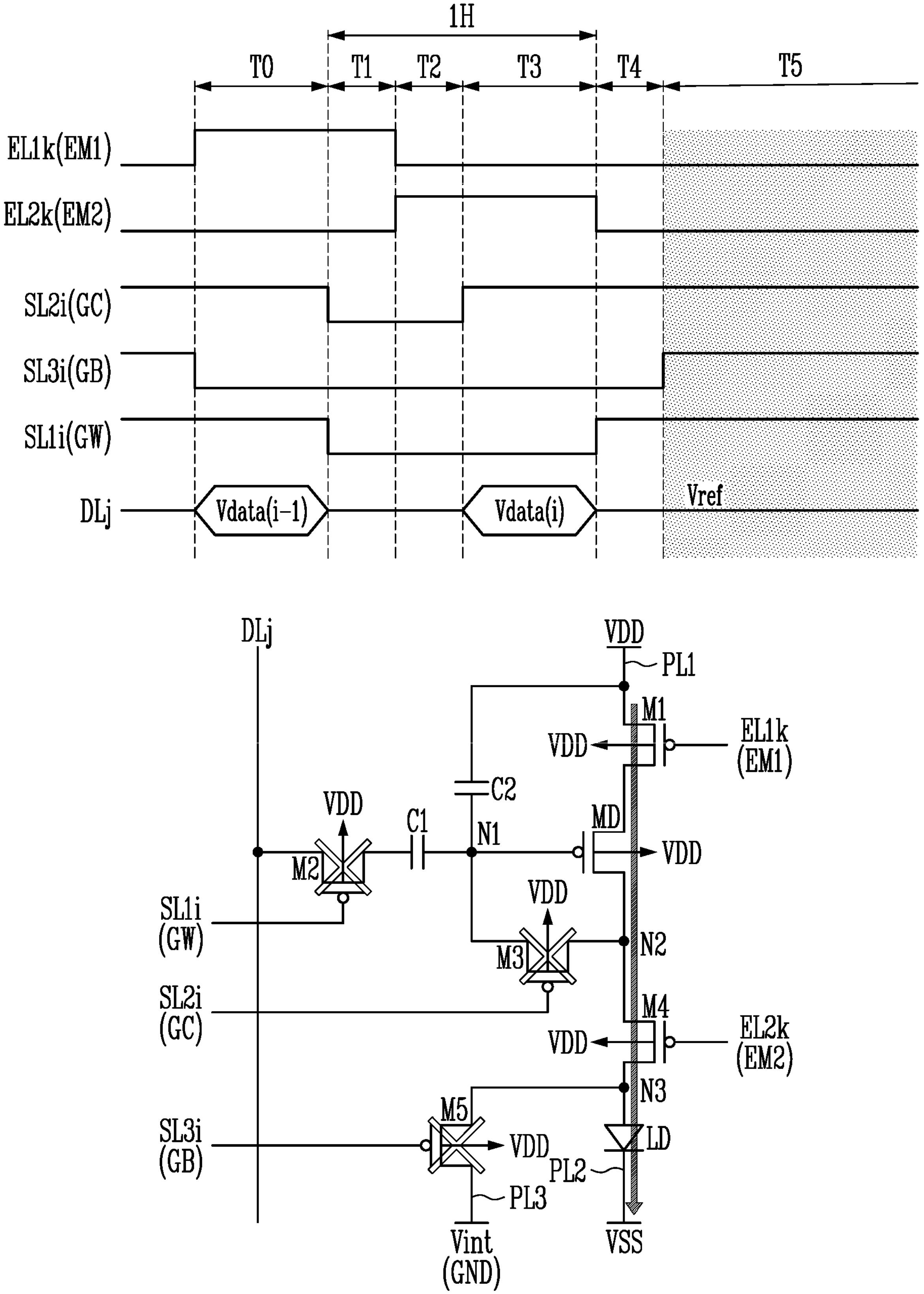

Referring to FIG. 6F, during the fifth period T5, the first emission control signal EM1 is not supplied to the first emission control line EL1*k*, and the second emission control signal EM2 is not supplied to the second emission control line EL2*k*. Therefore, during the fifth period T5, the first transistor M1 and the fourth transistor M4 are set to a turn-on state. In addition, supply of the third scan signal GB to the third scan line SL3*i* is stopped, and thus the fifth transistor M5 is set to a turn-off state.

Thus the driving transistor MD controls the current amount supplied from the first driving power VDD to the second driving power VSS via the light emitting element LD in response to the voltage of the first node N1. During the fifth period T5, the light emitting element LD may generate light of a luminance corresponding to a driving current amount supplied from the driving transistor MD.

Additionally, the current amount supplied from the driving transistor MD to the light emitting element LD during the fifth period T5 may be determined regardless of the threshold voltage of the driving transistor MD as shown in Equation 1.

$$ILD = K \times \left(\frac{C1}{C1 + C2}\right)^2 \times (V\text{data}(i) - Vref)^2 \qquad \text{[Equation 1]}$$

In Equation 1, ILD means the current supplied to the light emitting element LD, and K means a proportional constant determined by mobility of the driving transistor MD, a parasitic capacitance, a channel capacitance, and the like.

Referring to Equation 1, the current amount supplied from the driving transistor MD may be determined by the voltage Vdata(i) of the data signal and the reference power Vref regardless of the threshold voltage of the driving transistor MD.

Meanwhile, in an embodiment of the disclosure, a voltage of the first electrode of the driving transistor MD may be identically set during the second period T2 in which the threshold voltage of the driving transistor MD is compensated and the fifth period T5 in which the light emitting element LD emits light. For example, during the second period T2 and the fifth period T5, the voltage of the first electrode of the driving transistor MD may be set to the voltage of the driving power VDD. In this case, the threshold voltage of the driving transistor MD may be stably compensated.

Additionally, the pixel PXija shown in FIG. 4A and the pixel PXijc shown in FIG. 4C may also be driven as described above. A detailed description related to this is omitted.

Figure 7:
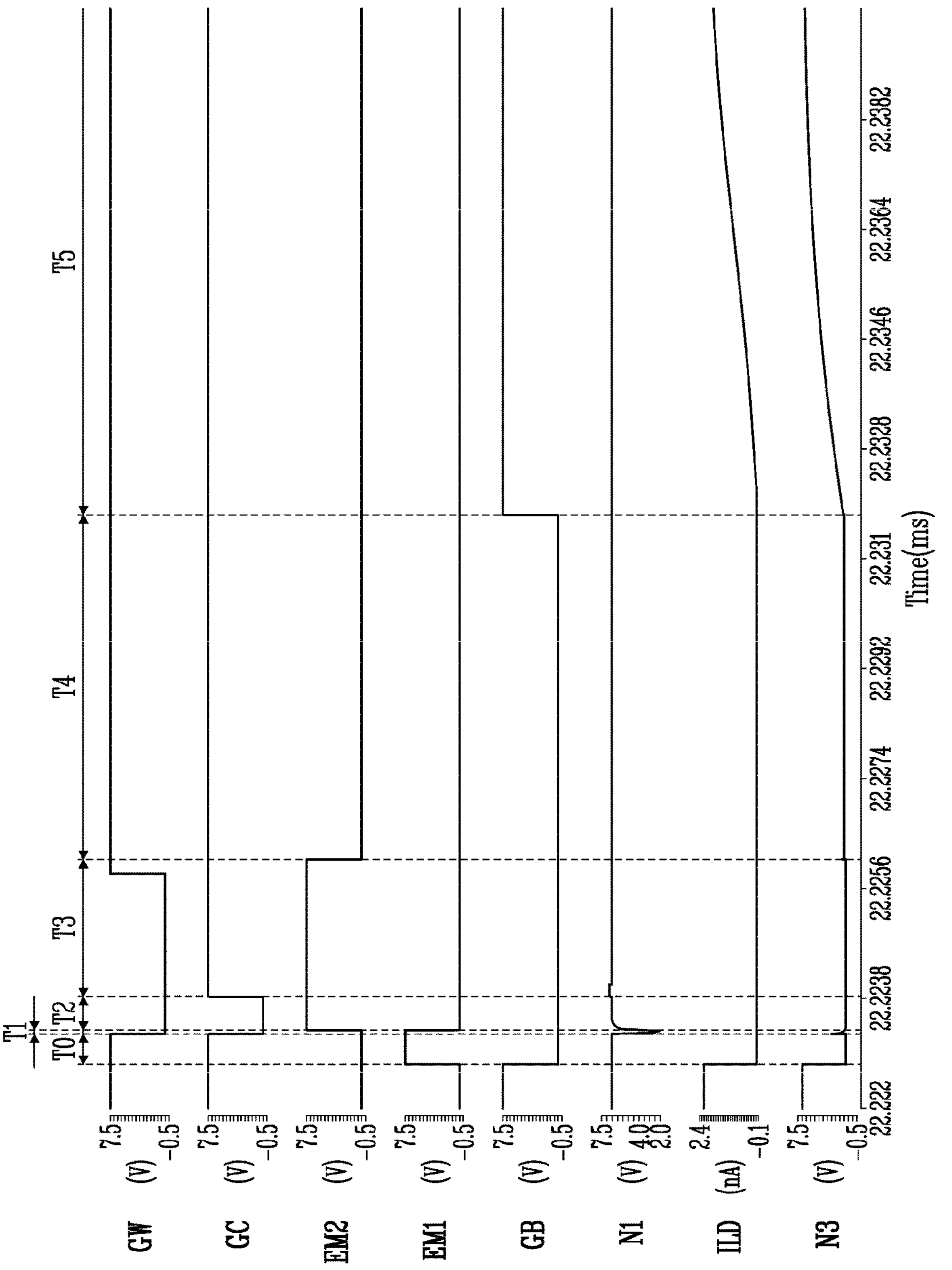
FIG. 7 is a diagram illustrating a simulation result corresponding to the driving waveform of FIG. 5.

FIG. 7 is a diagram illustrating a simulation result corresponding to the driving waveform of FIG. 5. In FIG. 7, an X-axis may mean a time. In FIG. 7, a Y-axis of the scan signals GW, GC, and GB, the emission control signals EM1 and EM2, the first node N1, and the third node N3 means a voltage [V], and a Y-axis of the current ILD means a current [nA].

Referring to FIG. 7, during the 0-th period T0, the third node N3 is initialized to the voltage of the initialization power Vint, and during the first period T1, the first node N1 is initialized to the voltage of the initialization power Vint. During the second period T2, the voltage of the first node N1 is increased to the voltage obtained by subtracting the absolute value threshold voltage of the driving transistor MD from the driving power VDD, and during the third period T3, the voltage of the first node N1 is boosted in response to the voltage Vdata(i) of the data signal. During the fourth period T4, a voltage of the third node N3 maintains approximately the voltage of the initialization power Vint.

During the fifth period T5, a current ILD amount of the light emitting element LD is increased in response to the current amount supplied from the driving transistor MD, and thus the voltage of the third node N3 is also increased. That is, the pixel PXijb according to an embodiment of the disclosure may be stably driven.

Figure 8:
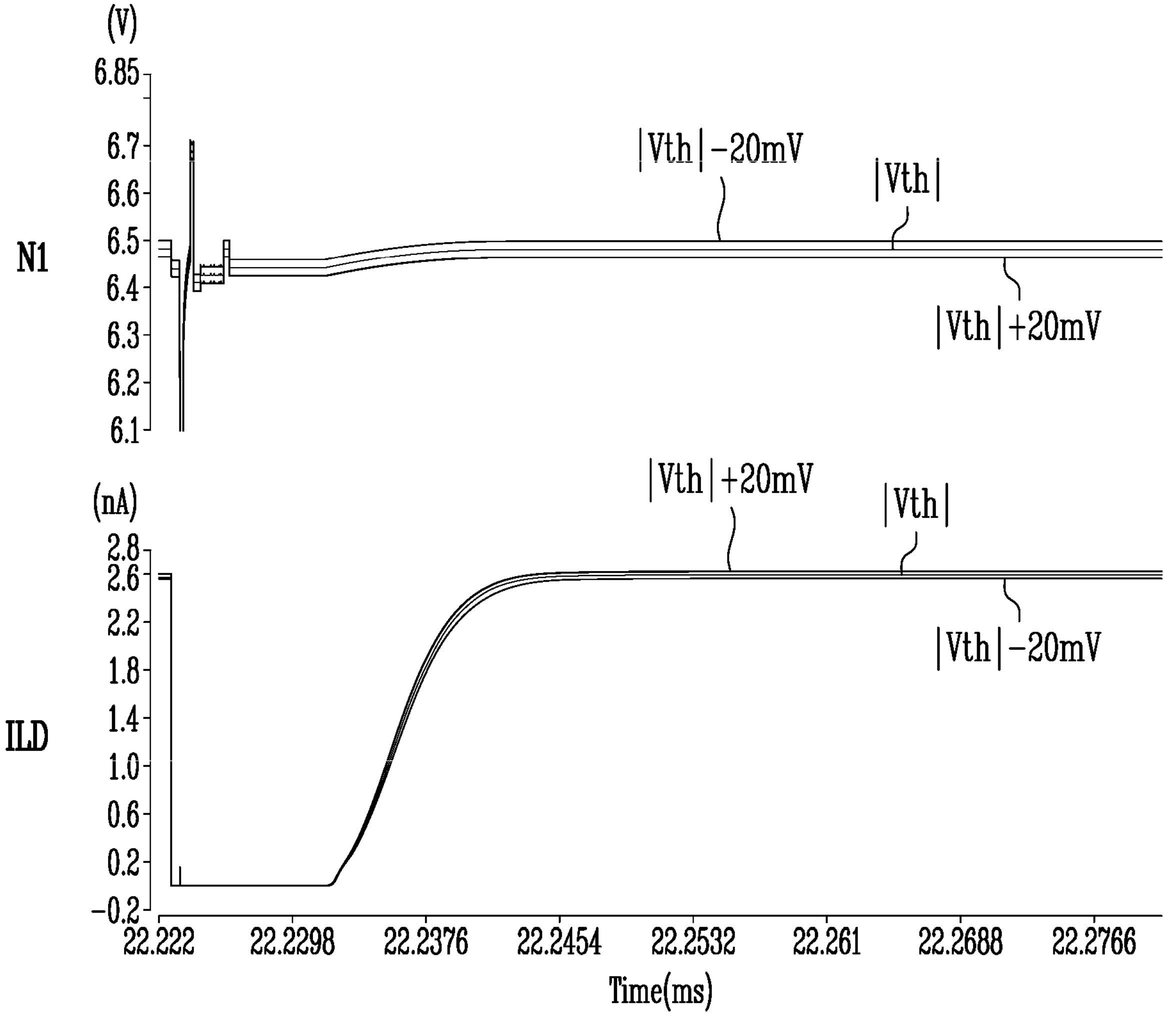
FIG. 8 is a diagram illustrating a change amount of a driving current corresponding to a change in a threshold voltage of a driving transistor in the pixel shown in FIG. 4B.

FIG. 8 is a diagram illustrating a change amount of the driving current corresponding to a change in the threshold voltage of the driving transistor in the pixel shown in FIG. 4B. In FIG. 8, an X-axis may mean a time. In FIG. 8, a Y-axis of the first node N1 means a voltage [V], and a Y-axis of the current ILD means a current [nA].

Referring to FIG. 8, when the threshold voltage of the driving transistor MD is changed by approximately −20 mV to +20 mV, the voltage of the first node N1 is changed in response to the threshold voltage of the driving transistor MD. That is, the voltage of the first node N1 is changed in response to the threshold voltage of the driving transistor MD, and thus the threshold voltage of the driving transistor MD may be compensated.

In addition, even in a case where the threshold voltage of the driving transistor MD is changed, the current ILD supplied to the light emitting element LD may have substantially similar (or equal) current value.

Figure 9:
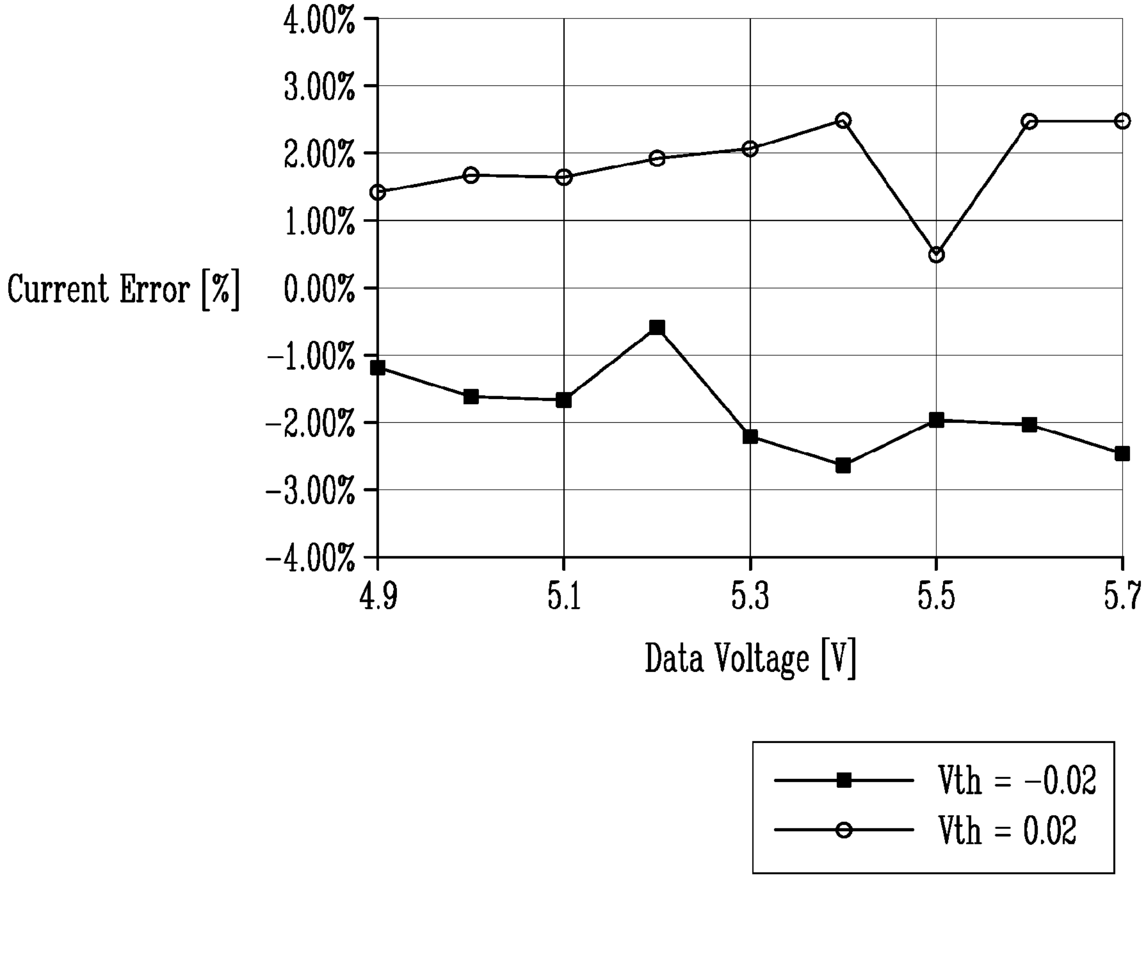
FIG. 9 is a diagram illustrating a current deviation of the pixel shown in FIG. 4B.

FIG. 9 is a diagram illustrating a current deviation of the pixel shown in FIG. 4B. In FIG. 9, an X-axis represents a voltage (or a grayscale) of the data signal, and a Y-axis represents a current deviation. The current deviation represents a change amount of the driving current corresponding to the change of the threshold voltage of the driving transistor MD as a percentage [%]. As an example, FIG. 9 illustrates a current deviation when the threshold voltage of the driving transistor MD is changed by −0.02V and +0.02V.

Referring to FIG. 9, when the threshold voltage of the driving transistor MD is changed by −0.02V and +0.02V, the current deviation is set to approximately −2.5% to +2.5%. That is, in a case of an embodiment of the disclosure, the threshold voltage of the driving transistor MD may be stably compensated.

Figure 10:
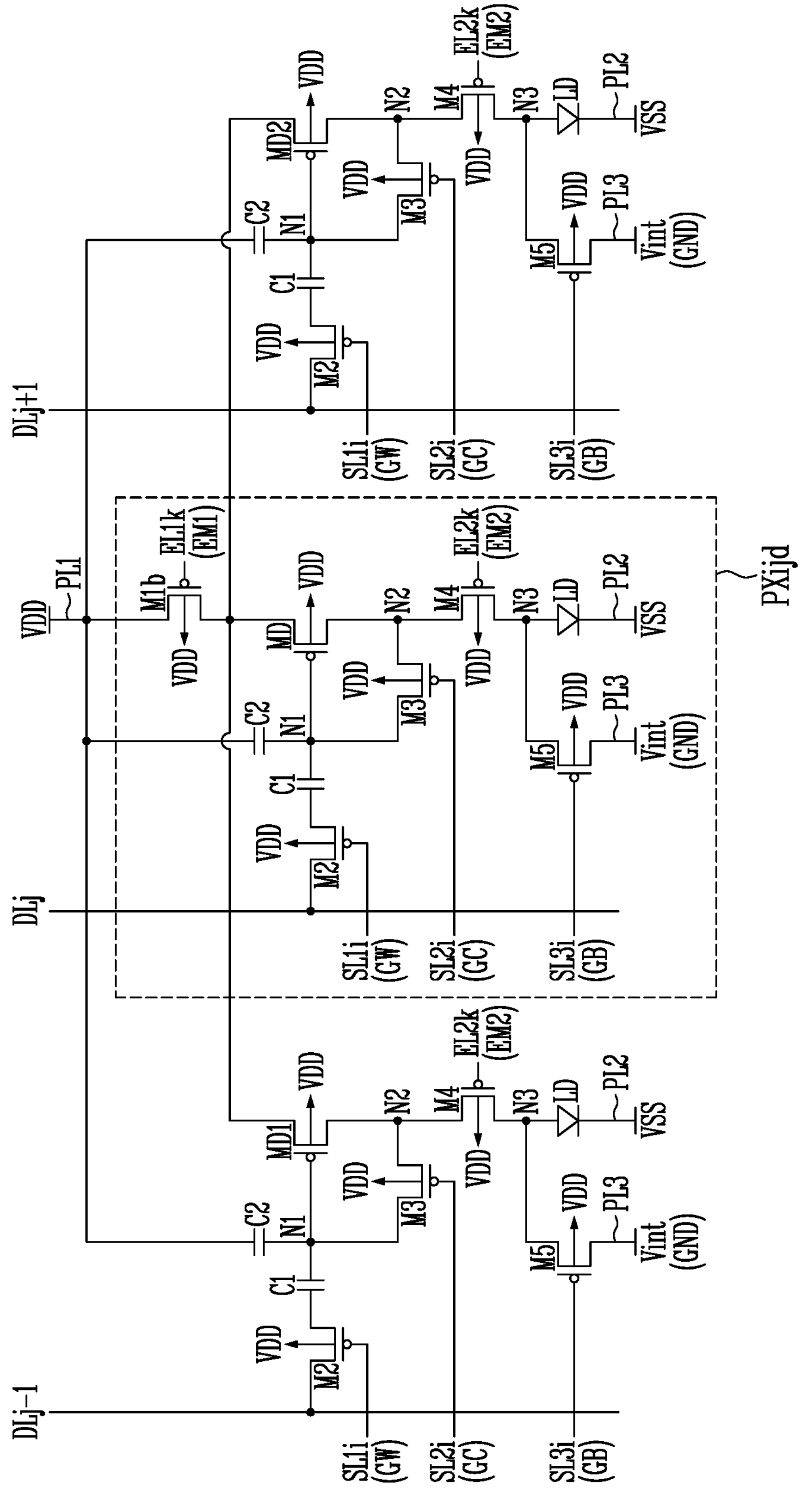
FIG. 10 is a diagram illustrating a pixel according to an embodiment of the disclosure.

FIG. 10 is a diagram illustrating a pixel according to an embodiment of the disclosure. When describing FIG. 10, a description overlapping that of FIG. 4B is omitted.

Referring to FIG. 10, the pixel PXijd (or a first pixel) according to an embodiment of the disclosure may be connected to corresponding signal lines SL1*i*, SL2*i*, SL3*i*, EL1*k*, EL2*k*, and DLj. For example, the first pixel PXijd may be connected to the i-th first scan line SL1*i*, the i-th second scan line SL2*i*, the i-th third scan line SL3*i*, the k-th first emission control line EL1*k*, the k-th second emission control line EL2*k*, and the j-th data line DLj. The pixel PXijd may be further connected to the first power line PL1, the second power line PL2, and the third power line PL3.

The first pixel PXijd according to an embodiment of the disclosure may include the light emitting element LD and the pixel circuit for controlling the current amount supplied to the light emitting element LD.

The pixel circuit may include the driving transistor MD, a first transistor M1*b*, the second transistor M2, the third transistor M3, the fourth transistor M4, the fifth transistor M5, the first capacitor C1, and the second capacitor C2.

The first transistor M1*b* included in the first pixel PXijd may be electrically connected to driving transistors MD1 and MD2 included in at least one another adjacently positioned pixel (or a second pixel). For example, the first transistor M1*b* included in the first pixel PXijd may be electrically connected to the driving transistors MD1 and MD2 of the second pixel positioned adjacent to a left side and a right side. That is, in an embodiment of the disclosure, at least two pixels positioned adjacent to each other may share the first transistor M1*b*. In this case, the first transistor M1*b* may be included in the first pixel PXijd, and the first transistor M1*b* may not be included in the second pixel. When the first transistor M1*b* is shared by the pixels positioned adjacent to each other, an integration degree of the pixel may be improved.

Although the above has been described with reference to the embodiments of the disclosure, those skilled in the art will understand that the disclosure may be variously modified and changed without departing from the spirit and scope of the disclosure described in the claims.

What is claimed is:

1. A pixel comprising:

a first capacitor connected between a first power line and a first node;

a first transistor including a first electrode electrically connected to a second electrode of the first capacitor and the first power line, and a gate electrode electrically connected to a first emission control line;

a driving transistor including a first electrode electrically connected to a second electrode of the first transistor, a second electrode connected to a second node, and a gate electrode connected to the first node;

a second transistor including a first electrode electrically connected to a data line, and a gate electrode electrically connected to a first scan line;

a third transistor connected between the first node and the second node and including a gate electrode electrically connected to a second scan line;

a second capacitor connected between a second electrode of the second transistor and the first node;

a light emitting element including a second electrode electrically connected to a second power line;

a fourth transistor connected between the second node and a first electrode of the light emitting element, and including a gate electrode electrically connected to a second emission control line; and a fifth transistor including a first electrode electrically connected to the first electrode of the light emitting element, a second electrode electrically connected to a third power line, and a gate electrode electrically connected to a third scan line, wherein each of the first transistor, the second transistor, the third transistor, the fourth transistor, and the fifth transistor is a MOSFET including a body electrode.

2. The pixel according to claim 1, wherein the driving transistor is a MOSFET including a body electrode.

3. The pixel according to claim 2, wherein a voltage of first driving power is supplied to the first power line and the voltage of the first driving power is supplied to the body electrode.

4. The pixel according to claim 1, wherein the first transistor is set to a turn-on state when a data signal is supplied to the data line.

5. The pixel according to claim 1, wherein a voltage of first driving power is supplied to the first power line and the voltage of the first driving power is supplied to the body electrode of the each of the first transistor, the second transistor, the third transistor, the fourth transistor, and the fifth transistor.

6. The pixel according to claim 1, wherein first driving power is supplied to the first power line, second driving power having a voltage lower than that of the first driving power is supplied to the second power line, and initialization power having a voltage value at which the light emitting element does not emit light is supplied to the third power line.

7. The pixel according to claim 6, wherein a voltage value obtained by subtracting the second driving power from a voltage obtained by adding a voltage of the initialization power to an absolute threshold voltage of the fifth transistor is set to a voltage lower than a threshold voltage of the light emitting element.

8. The pixel according to claim 6, wherein the initialization power is ground (GND).

9. The pixel according to claim 1, wherein one horizontal period includes a first period, a second period, and a third period, wherein a voltage of reference power is supplied to the data line during the first period and the second period, and a voltage of the data signal is supplied to the data line during the third period, and wherein the second transistor, the third transistor, the fourth transistor, and the fifth transistor are set to a turn-on state, and the first transistor is set to a turn-off state during the first period.

10. The pixel according to claim 9, wherein the first transistor, the second transistor, the third transistor, and the fifth transistor are set to a turn-on state, and the fourth transistor is set to a turn-off state during the second period.

11. The pixel according to claim 9, wherein the first transistor, the second transistor, and the fifth transistor are set to a turn-on state, and the third transistor and the fourth transistor are set to a turn-off state, during the third period.

12. The pixel according to claim 9, wherein the first transistor, the fourth transistor, and the fifth transistor are set to a turn-on state, and the second transistor and the third transistor are set to a turn-off state during a fourth period following the third period, and the first transistor and the fourth transistor are set to a turn-on state, and the second transistor, the third transistor, and the fifth transistor are set to a turn-off state during a fifth period following the fourth period.

13. The pixel according to claim 9, wherein the fourth transistor and the fifth transistor are set to a turn-on state, and the first transistor, the second transistor, and the third transistor are set to a turn-off state during a 0-th period preceding the first period.

14. A display device comprising:

pixels connected to first scan lines, second scan lines, third scan lines, data lines, first emission control lines, and second emission control lines, wherein a first pixel positioned in an i-th (i is an integer greater than or equal to 0) pixel row and a j-th (j is an integer greater than or equal to 0) pixel column comprises:

a first capacitor connected between a first power line and a first node;

a first transistor including a first electrode electrically connected to a second electrode of the first capacitor and a first power line, and turned off when a first emission control signal is supplied to a k-th (k is an integer greater than or equal to 0) first emission control line;

a driving transistor including a first electrode electrically connected to a second electrode of the first transistor, a second electrode connected to a second node, and a gate electrode connected to the first node;

a second transistor including a first electrode electrically connected to a j-th data line and turned on when a first scan signal is supplied to an i-th first scan line;

a third transistor connected between the first node and the second node and turned on when a second scan signal is supplied to an i-th second scan line;

a second capacitor connected between a second electrode of the second transistor and the first node;

a light emitting element including a second electrode electrically connected to a second power line;

a fourth transistor connected between the second node and a first electrode of the light emitting element, and including a gate electrode electrically connected to a second emission control line; and a fifth transistor including a first electrode electrically connected to the first electrode of the light emitting element, a second electrode electrically connected to a third power line, and a gate electrode electrically connected to a third scan line, and wherein each of the driving transistor, the first transistor, the second transistor, the third transistor, the fourth transistor, and the fifth transistor is a MOSFET including a body electrode.

15. The display device according to claim 14, wherein a driving transistor included in a second pixel positioned adjacent to the first pixel is electrically connected to the first transistor included in the first pixel.

16. The display device according to claim 14, wherein the first transistor is set to a turn-on state when a data signal is supplied to the j-th data line.

17. The display device according to claim 14, wherein the body electrode of the each of the driving transistor, the first transistor, the second transistor, the third transistor, the fourth transistor, and the fifth transistor is electrically connected to the first power line.

18. The display device according to claim 14, further comprising:

a data driver configured to supply data signals to the data lines;

a first scan driver configured to supply first scan signals to the first scan lines;

a second scan driver configured to supply second scan signals to the second scan lines;

a third scan driver configured to supply third scan signals to the third scan lines;

a first emission driver configured to supply first emission control signals to the first emission control lines; and a second emission driver configured to supply second emission control signals to the second emission control lines.

19. The display device according to claim 18, wherein a specific horizontal period in which the first pixel is driven includes a first period, a second period, and a third period, wherein the data driver supplies voltage of reference power to the j-th data line during the first period and the second period, and supplies the data signal during the third period, wherein the first scan driver supplies the first scan signal to the i-th first scan line during the first period, the second period, and the third period, wherein the second scan driver supplies the second scan signal to the i-th second scan line during the first period and the second period, wherein the third scan driver supplies the third scan signal to the i-th third scan line during a 0-th period preceding the first period, the first period, the second period, the third period, and a fourth period following the third period, wherein the first emission driver supplies the first emission control signal to the k-th first emission control line during the 0-th period and the first period, and wherein the second emission driver supplies the second emission control signal to the k-th second emission control line during the second period and the third period.

* * * * *